(12) United States Patent
Pezeshki et al.

(10) Patent No.: US 12,278,800 B2
(45) Date of Patent: *Apr. 15, 2025

(54) RESOLVING BLOCKCHAIN DOMAINS

(71) Applicant: Unstoppable Domains Inc., Las Vegas, NV (US)

(72) Inventors: Braden River Pezeshki, Reno, NV (US); Matthew Everett Gould, Reno, NV (US); Bogdan Gusiev, Kyiv (UA)

(73) Assignee: Unstoppable Domains Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,214

(22) Filed: Nov. 17, 2023

(65) Prior Publication Data

US 2024/0244030 A1  Jul. 18, 2024

Related U.S. Application Data

(63) Continuation of application No. 17/991,498, filed on Nov. 21, 2022, now Pat. No. 11,876,774, which is a (Continued)

(51) Int. Cl.
*H04L 9/30* (2006.01)
*H04L 9/32* (2006.01)
(Continued)

(52) U.S. Cl.
CPC ........ *H04L 61/4511* (2022.05); *H04L 9/3236* (2013.01); *H04L 9/3247* (2013.01); (Continued)

(58) Field of Classification Search
None
See application file for complete search history.

(56) References Cited

U.S. PATENT DOCUMENTS 10,361,843 B1   7/2019  Suthar
10,540,654 B1 *  1/2020  James ................ G06Q 20/223
(Continued)

FOREIGN PATENT DOCUMENTS

EP        3782346     2/2021
WO    2019027409     2/2019
WO    2020051160     3/2020

OTHER PUBLICATIONS

Eugene Shumilov, "3 ways to use Blockchain DNS in your browser", pp. 1-3, Sep. 21, 2017, Medium, https://medium.com/@emer.tech/3-ways-to-use-blockchain-dns-in-your-browser-79d937028407 (last visited Jul. 7, 2023).

(Continued)

*Primary Examiner* — Christopher B Robinson
(74) *Attorney, Agent, or Firm* — Van Pelt, Yi & James LLP

(57) ABSTRACT

A request to resolve a name of a domain of an identifier of web content is received. It is automatically determined that the name of the domain is to be resolved using a blockchain. A request is sent to a smart contract of the blockchain to obtain one or more resolution records for the domain. The one or more resolution records of the domain are received. The received one or more resolution records are utilized to resolve the name of the domain.

20 Claims, 15 Drawing Sheets

Related U.S. Application Data continuation of application No. 17/486,512, filed on Sep. 27, 2021, now Pat. No. 11,558,344.

(60) Provisional application No. 63/084,493, filed on Sep. 28, 2020.

(51) Int. Cl.
| | |
|---|---|
| *H04L 12/66* | (2006.01) |
| *H04L 61/4511* | (2022.01) |
| *H04L 61/5007* | (2022.01) |
| *H04L 67/02* | (2022.01) |
| *G06Q 20/38* | (2012.01) |
| *H04L 9/00* | (2022.01) |

(52) U.S. Cl.
CPC .......... *H04L 12/66* (2013.01); *H04L 61/5007* (2022.05); *H04L 67/02* (2013.01); *G06Q 20/389* (2013.01); *H04L 9/50* (2022.05)

(56) References Cited

U.S. PATENT DOCUMENTS

| | | | |
|---|---|---|---|
| 10,721,060 B1* | 7/2020 | Kaizer | H04L 63/123 |
| 10,990,584 B1 | 4/2021 | Basak | |
| 11,720,552 B2 | 8/2023 | Kasimov | |
| 11,727,366 B1 | 8/2023 | Cutler | |
| 2004/0249939 A1 | 12/2004 | Amini | |
| 2005/0235031 A1 | 10/2005 | Schneider | |
| 2013/0114432 A1 | 5/2013 | Haynes | |
| 2017/0048234 A1* | 2/2017 | Lohe | H04L 63/0807 |
| 2017/0048235 A1* | 2/2017 | Lohe | G06Q 50/01 |
| 2017/0085555 A1 | 3/2017 | Bisikalo | |
| 2017/0109735 A1* | 4/2017 | Sheng | G06Q 20/3678 |
| 2017/0221052 A1 | 8/2017 | Sheng | |
| 2017/0236123 A1 | 8/2017 | Ali | |
| 2018/0115413 A1 | 4/2018 | King | |
| 2019/0043048 A1 | 2/2019 | Wright | |
| 2019/0108140 A1 | 4/2019 | Deshpande | |
| 2019/0166085 A1 | 5/2019 | Li | |
| 2019/0318359 A1 | 10/2019 | Arora | |
| 2019/0340269 A1 | 11/2019 | Biernat | |
| 2019/0349426 A1 | 11/2019 | Smith | |
| 2019/0358515 A1 | 11/2019 | Tran | |
| 2020/0028691 A1 | 1/2020 | Rao | |
| 2020/0044827 A1 | 2/2020 | Snow | |
| 2020/0117690 A1* | 4/2020 | Tran | G06F 16/90332 |
| 2020/0118131 A1 | 4/2020 | Diriye | |
| 2020/0133955 A1 | 4/2020 | Padmanabhan | |
| 2020/0134656 A1 | 4/2020 | Padmanabhan | |
| 2020/0143469 A1 | 5/2020 | Stewart | |
| 2020/0167773 A1 | 5/2020 | Cervenka | |
| 2020/0201560 A1 | 6/2020 | Yang | |
| 2020/0202021 A1 | 6/2020 | Chee | |
| 2020/0213090 A1 | 7/2020 | Gupta | |
| 2020/0242105 A1* | 7/2020 | Rich | H04L 9/40 |
| 2020/0322154 A1 | 10/2020 | Konda | |
| 2020/0328883 A1 | 10/2020 | Kaizer | |
| 2020/0358784 A1 | 11/2020 | Khaund | |
| 2021/0158335 A1 | 5/2021 | Bollen | |
| 2021/0211468 A1 | 7/2021 | Griffin | |
| 2021/0240784 A1 | 8/2021 | Xiao | |
| 2021/0319433 A1* | 10/2021 | Yantis | G06Q 20/065 |
| 2021/0328778 A1 | 10/2021 | Becher | |
| 2022/0198447 A1 | 6/2022 | Haruna | |
| 2022/0318796 A1 | 10/2022 | Zhou | |
| 2023/0206216 A1 | 6/2023 | Lehmann | |

OTHER PUBLICATIONS

Firefox user 13228151, "Blockchain DNS," pp. 1-3, Apr. 23, 2018, Firefox Browser Add-Ons, https://addons.mozilla.org/en-US/firefox/addon/b-dns/ (last visited Jul. 7, 2023).

Nick Johnson, "EIP-137: Ethereum Domain Name Service—Specification," Ethereum Improvement Proposals, No. 137, Apr. 2016. [Online serial]. Available: https://eips.ethereum.org/EIPS/eip-137.

Phyrex Tsai, Portal Network Team, "EIP-1062: Formalize IPFS hash into ENS(Ethereum NameService) resolver [Draft]," Ethereum Improvement Proposals, No. 1062, May 2018. [Online serial]. Available: https://eips.ethereum.org/EIPS/eip-1062.

Steve Despres, "DNS on Blockchain: the next evolution of domain names?", pp. 1-8, Apr. 8, 2020, Nameshield Blog, https://blog.nameshield.com/blog/2020/04/08/dns-on-blockchain-the-next-evolution-of-domain-names/ (last visited Jul. 7, 2023).

Patent Owner's Preliminary Response to Inter-Partes Review in U.S. Pat. No. 11,558,344 filed on Aug. 29, 2024.

Petition for Inter Partes Review of U.S. Pat. No. 11,558,344 filed on May 2, 2024, pp. 1-76.

Exhibit 1003 from Petition for Inter Partes Review of U.S. Pat. No. 11,558,344 filed on May 2, 2024, Nick Johnson, ENS Documentation, Release 0.1, Mar. 30, 2019. (captured on the Internet Archive, Dec. 13, 2019) https://buildmedia.readthedocs.org/media/pdf/ens/latest/ens.pdf.

Exhibit 1004 from Petition for Inter Partes Review of U.S. Pat. No. 11,558,344 filed on May 2, 2024, Brantly Millegan, "ENS Now Supports Tor .Onion Address Resolution," Aug. 13, 2019 (captured on the Internet Archive, Aug. 15, 2019). https://medium.com/the-ethereum-name-service/ens-now-supports-tor-onion-address-resolution-9bb3bdff6217.

Exhibit 1006 from Petition for Inter Partes Review of U.S. Pat. No. 11,558,344 filed on May 2, 2024, Jim McDonald, "EthDNS: an Ethereum backend for the Domain Name System," Jan. 22, 2018 (captured on the Internet Archive, Feb. 8, 2018) https://medium.com/@jgm.orinoco/ethdns-an-ethereum-backend-for-the-domain-name-system-d52dabd904b3.

Exhibit 1008 from Petition for Inter Partes Review of U.S. Pat. No. 11,558,344 filed on May 2, 2024, Richard Moore, "EIP-634: Storage of text records in ENS," May 17, 2017 (captured on the Internet Archive Mar. 13, 2019) https://eips.ethereum.org/EIPS/eip-634.

Exhibit 1012 from Petition for Inter Partes Review of U.S. Pat. No. 11,558,344 filed on May 2, 2024, Vaibhav Saini, "StoragePedia: An Encyclopedia of 5 Blockchain Storage Platforms," Aug. 13, 2018 (captured on the Internet Archive Aug. 21, 2018). Available: https://hackernoon.com/storagepedia-an-encyclopedia-of-5-blockchain-storage-platform-8aa13c630ace.

Exhibit 1016 from Petition for Inter Partes Review of U.S. Pat. No. 11,558,344 filed on May 2, 2024, Entriken, William et al., "ERC-721: Non-Fungible Token Standard," Ethereum Improvement Proposals, No. 721, Jan. 2018. [Online serial]. Available: https://eips.ethereum.org/EIPS/eip-721.

Exhibit 1019 from Petition for Inter Partes Review of U.S. Pat. No. 11,558,344 filed on May 2, 2024, Ethereum Name Service, ".eth Permanent Registrar," captured on the Internet Archive, May 4, 2019, https://web.archive.org/web/20190504155147/https://docs.ens.domains/contract-api-reference/.eth-permanent-registrar.

Exhibit 1030 from Petition for Inter Partes Review of U.S. Pat. No. 11,558,344 filed on May 2, 2024, Lutkevich, Ben, et al., Definition: domain name system (DNS), Aug. 2021. Available: https://www.techtarget.com/searchnetworking/definition/domain-name-system.

Exhibit 1031 from Petition for Inter Partes Review of U.S. Pat. No. 11,558,344 filed on May 2, 2024, "What is DNS? How DNS works." Available: https://www.cloudflare.com/learning/dns/what-is-dns/.

Exhibit 1032 from Petition for Inter Partes Review of U.S. Pat. No. 11,558,344 filed on May 2, 2024, Yasar, Kinza, Definition: IP address (Internet Protocol address), Jan. 2023. Available: https://www.techtarget.com/whatis/definition/IP-address-Internet-Protocol-Address.

Exhibit 1033 from Petition for Inter Partes Review of U.S. Pat. No. 11,558,344 filed on May 2, 2024, IP Tracker. Available: https://www.ip-tracker.org/lookup.php?ip=nytimes.com.

Exhibit 1034 from Petition for Inter Partes Review of U.S. Pat. No. 11,558,344 filed on May 2, 2024, Scarpati, Jessica, et al., Definition: URL (Uniform Resource Locator), Sep. 2021. Available: https://www.techtarget.com/searchnetworking/definition/URL.

(56) References Cited

OTHER PUBLICATIONS

Exhibit 1035 from Petition for Inter Partes Review of U.S. Pat. No. 11,558,344 filed on May 2, 2024, Coen, Emanuel, "What is the Ethereum Name Service and what is it good for?" (Almost 4 Years Ago). Available: https://cryptotesters.com/blog/what-is-the-ethereum-name-service-ens-and-what-is-it-good-for.
Exhibit 1036 from Petition for Inter Partes Review of U.S. Pat. No. 11,558,344 filed on May 2, 2024, CloudFlare, "DNS server types." Available: https://www.cloudflare.com/learning/dns/dns-server-types/.
Exhibit 1037 from Petition for Inter Partes Review of U.S. Pat. No. 11,558,344 filed on May 2, 2024, Barney, Nick, et al., "Definition: blockchain," Oct. 2023. Available: https://www.techtarget.com/searchcio/definition/blockchain.
Exhibit 1038 from Petition for Inter Partes Review of U.S. Pat. No. 11,558,344 filed on May 2, 2024, Ravikiran A S, What is Blockchain Technology? How Does Blockchain Work? {Updated}, Oct. 18, 2023. Available: https://www.simplilearn.com/tutorials/blockchain-tutorial/blockchain-technology#:~:text=A%20blockchain%20is%20a%20distributed%2C%20immutable%2C%20and%20decentralized%20ledger%20at,a%20chronological%20chain%20of%20information.
Exhibit 1039 from Petition for Inter Partes Review of U.S. Pat. No. 11,558,344 filed on May 2, 2024, MetaMask, "Learn the basics of blockchains and Ethereum (miners and validators, gas, cryptocurrencies and NFTs, block explorer, networks, etc.)." Available: https://support.metamask.io/hc/en-us/articles/360015489611-Learn-the-basics-of-blockchains-and-Ethereum-miners-and-validators-gas-cryptocurrencies-and-NFTs-block-explorer-networks-etc.
Exhibit 1040 from Petition for Inter Partes Review of U.S. Pat. No. 11,558,344 filed on May 2, 2024, Kerner, Sean Michael, et al., "Definition: Ethereum," Jan. 2022. Available: https://www.techtarget.com/whatis/definition/Ethereum#:~:text=Ethereum%20is%20a%20blockchain%2Dbased,a%20number%20of%20financial%20uses.
Exhibit 1041 from Petition for Inter Partes Review of U.S. Pat. No. 11,558,344 filed on May 2, 2024, Barney, Nick, et al., "Definition: smart contract," Sep. 2023. Available: https://www.techtarget.com/searchcio/definition/smart-contract#:~:text=Smart%20contracts%20function%20on%20the,in%20the%20contract%20are%20executed.
Exhibit 1042 from Petition for Inter Partes Review of U.S. Pat. No. 11,558,344 filed on May 2, 2024, Barney, Nick, et al. Definition: non-fungible token (NFT), Sep. 2023. Available: https://www.techtarget.com/whatis/definition/nonfungible-token-NFT#:~:text=NFTs%20are%20created%20using%20smart,such%20as%20ownership%20and%20transferability.
Exhibit 1043 from Petition for Inter Partes Review of U.S. Pat. No. 11,558,344 filed on May 2, 2024, Amazon, Non-Fungible Tokens (NFTs) Explained. Available: https://aws.amazon.com/blockchain/nfts-explained/#:~:text=Under%20the%20hood%2C%20a%20non,token%20to%20a%20new%20owner.
Exhibit 1044 from Petition for Inter Partes Review of U.S. Pat. No. 11,558,344 filed on May 2, 2024, Sharma, Rakesh, et al., "Cryptocurrency: Non-Fungible Token (NFT): What It Means and How It Works," Jan. 28, 2024. Available: https://www.investopedia.com/non-fungible-tokens-nft-5115211#:~:text=Non%2Dfungible%20tokens%20(NFTs),are%20stored%20in%20other%20places.
Exhibit 1045 from Petition for Inter Partes Review of U.S. Pat. No. 11,558,344 filed on May 2, 2024, Wade, Jacob, et al., "Cryptocurrency—Strategy & Education: How to Create an NFT," Dec. 9, 2023. Available: https://www.investopedia.com/how-to-create-an-nft-6362495.
Exhibit 1046 from Petition for Inter Partes Review of U.S. Pat. No. 11,558,344 filed on May 2, 2024, DeFi—Non-Fungible Tokens (NFTs): The Technical Structure of NFTs Explained, Mar. 10, 2023. Available: https://www.gemini.com/cryptopedia/what-is-a-non-fungible-token-nft-crypto.
Exhibit 1047 from Petition for Inter Partes Review of U.S. Pat. No. 11,558,344 filed on May 2, 2024, Cooling, Sam, "What is ERC-721?" Jul. 20, 2023. Available: https://www.techopedia.com/definition/erc-721.
Exhibit 1048 from Petition for Inter Partes Review of U.S. Pat. No. 11,558,344 filed on May 2, 2024, Ethereum, "ERC-721 Non-Fungible Token Standard," Nov. 19, 2023. Available: https://ethereum.org/en/developers/docs/standards/tokens/erc-721/.
Exhibit 1050 from Petition for Inter Partes Review of U.S. Pat. No. 11,558,344 filed on May 2, 2024, Future Learn. "How do crypto-wallets work?" RMIT 2021. Available: https://www.futurelearn.com/info/courses/defi-exploring-decentralised-finance-with-blockchain-technologies/0/steps/254823#:~:text=In%20the%20context%20of%20blockchains,wallet%20does%20not%20hold%20tokens.
Exhibit 1051 from Petition for Inter Partes Review of U.S. Pat. No. 11,558,344 filed on May 2, 2024, "Ethereum wallets: A beginner's guide to storing ETH." Available: https://cointelegraph.com/learn/ethereum-wallets-a-beginners-guide-to-storing-eth.
Exhibit 1052 from Petition for Inter Partes Review of U.S. Pat. No. 11,558,344 filed on May 2, 2024, Ghobadi, Arya, "What is MetaMask?" Mar. 15, 2022. Available: https://thedefiant.io/what-is-metamask.
Exhibit 1053 from Petition for Inter Partes Review of U.S. Pat. No. 11,558,344 filed on May 2, 2024, Shi, Z. et al., "Integration of Blockchain and Auction Models: A Survey, Some Applications, and Challenges," IEEE Communications Surveys & Tutorials, vol. 25, No. 1, First Quarter 2023, pp. 497-537, https://doi.org/10.1109/COMST.2022.3222403. Available: https://ieeexplore.ieee.org/stamp/stamp.jsp?arnumber=9953944.
Exhibit 1054 from Petition for Inter Partes Review of U.S. Pat. No. 11,558,344 filed on May 2, 2024, Seike, H., et al., "Blockchain-Based Ubiquitous Code Ownership Management System without Hierarchical Structure," 2018 IEEE SmartWorld, Cloud & Big Data Computing, Internet of People and Smart City Innovation (SmartWorld/SCALCOM/UIC/ATC/CBDCom/IOP/SCI), Guangzhou, China, 2018, pp. 271-276, doi: 10.1109/SmartWorld.2018.00081. Available: https://ieeexplore.ieee.org/document/8560059.
Exhibit 1055 from Petition for Inter Partes Review of U.S. Pat. No. 11,558,344 filed on May 2, 2024, CryptoNinjas, "Ethereum Name Service (ENS) now supports Tor .onion addresses," Aug. 14, 2019. Available: https://www.cryptoninjas.net/2019/08/14/ethereum-name-service-ens-now-supports-tor-onion-addresses/.
Exhibit 1056 from Petition for Inter Partes Review of U.S. Pat. No. 11,558,344 filed on May 2, 2024, Cryptonomist, Tor: the .onion domain on Ethereum Name Service, Aug. 15, 2019. Available: https://en.cryptonomist.ch/2019/08/15/tor-on-ethereum-name-service/.
Decision Denying Institution of Inter Partes Review of U.S. Pat. No. 11,558,344 mailed Nov. 22, 2024, pp. 1-27.

\* cited by examiner

RESOLVING BLOCKCHAIN DOMAINS

CROSS REFERENCE TO OTHER APPLICATIONS

This application is a continuation of U.S. patent application Ser. No. 17/991,498 entitled RESOLVING BLOCKCHAIN DOMAINS filed Nov. 21, 2022 which is incorporated herein by reference for all purposes, which is a continuation of U.S. patent application Ser. No. 17/486,512 entitled RESOLVING BLOCKCHAIN DOMAINS filed Sep. 27, 2021, now U.S. Pat. No. 11,558,344, which is incorporated herein by reference for all purposes, which claims priority to U.S. Provisional Patent Application No. 63/084,493 entitled BLOCKCHAIN DOMAINS filed Sep. 28, 2020 which is incorporated herein by reference for all purposes.

BACKGROUND OF THE INVENTION

Domain name system (DNS) is a naming system for computer resources connected to a network. It allows a user to refer to the resource using a human-friendly identifier that is easy to understand and remember rather than requiring the user to use a native functional identifier that is often unintuitive and difficult to remember. For example, the domain name system allows a user to reference a website by its human-friendly hostname/URL (Uniform Resource Locator) rather than using its IP (Internet Protocol) address. Typically a domain name registrar acts as a centralized entity that manages registration, record updating, transfer, and hosting of a domain name system. However, this centralized management and execution of the domain name system concentrates power and innovation in a central entity that may not be able to fulfill its duty in the best interest of the community. For example, the central entity may become a central point of failure, stifle innovation, or unjustly institute policies that prevent flow of information. Often users utilize a web browser to access web resources identified using a domain name. If a new mechanism to resolve domains is to be implemented, there exists a need for a way to enable the web browser to resolve these domains using the new mechanism.

BRIEF DESCRIPTION OF THE DRAWINGS

Various embodiments of the invention are disclosed in the following detailed description and the accompanying drawings.

DETAILED DESCRIPTION

Figure 1:
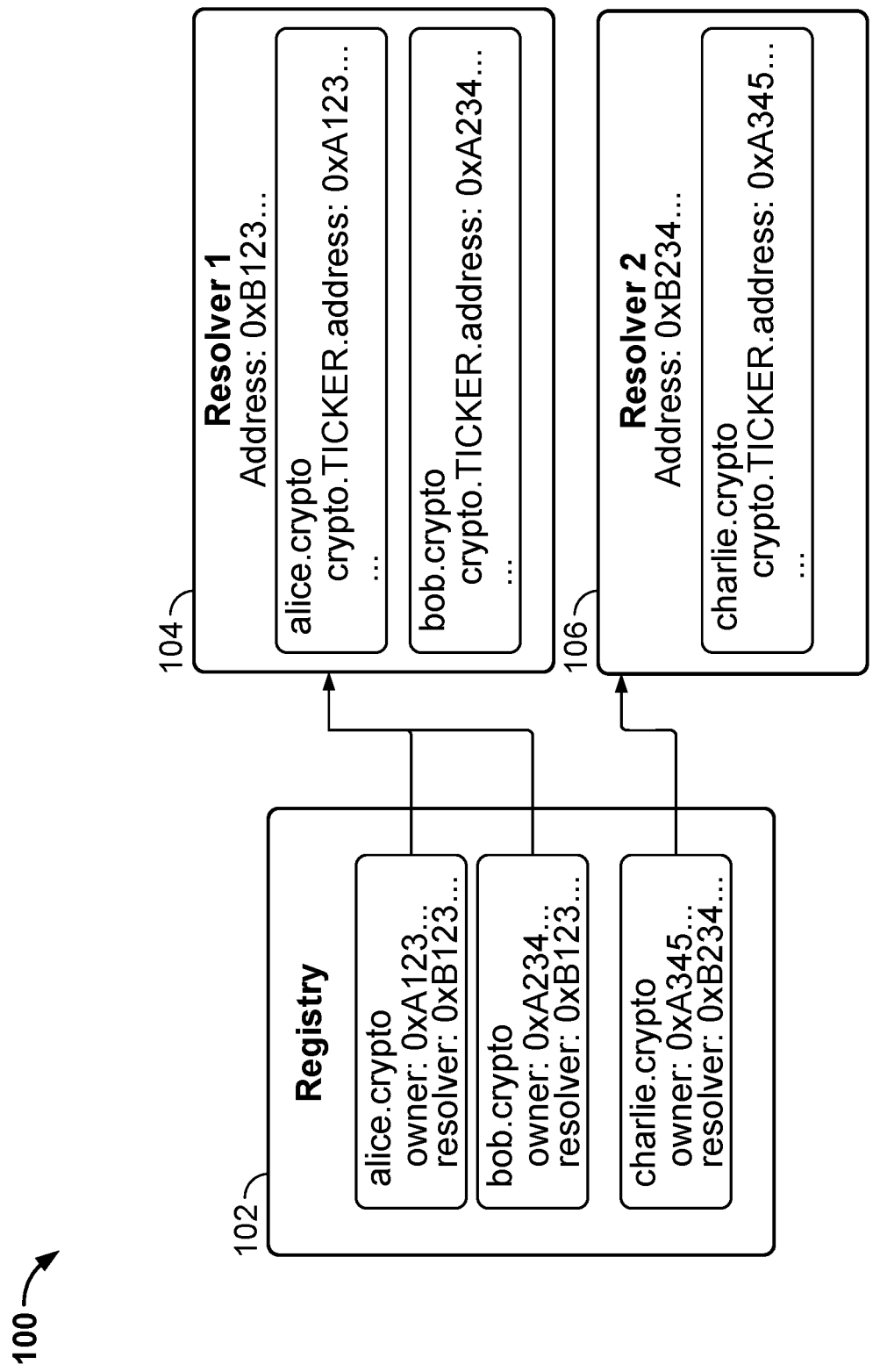
FIG. 1 is a block diagram illustrating an embodiment of blockchain smart contracts utilized to implement a name service on a blockchain.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A decentralized name service based on blockchain technology is disclosed. In some embodiments, the name service is based on a set of smart contracts on the crypto blockchain (e.g., Ethereum blockchain) that govern how domains are created and used. Although it can serve a similar purpose as a traditional DNS system, a decentralized name service has architectural differences that change the interaction model. For example, decentralized name service domains can be owned irrevocably. In some embodiments, they do not need to be renewed and cannot be reclaimed by a central authority. For example, once claimed, users have complete control of their domains. The blockchain is a decentralized and distributed computer ledger that records transactions that are publicly viewable and verifiable. The transactions can be audited to ensure an object tracked on the blockchain has been transferred only once between each party in each transaction without being reproduced to be double spent. By tracking ownership of a domain on the name service blockchain, public, secure, and verifiable ownership of a domain is ensured.

The decentralized name service is deployed using smart contracts. A smart contract includes self-executing code that functions to implement an agreement deployed to store state and execute code on the blockchain. This allows an agreed upon contract code to execute in a distributed and verifiable manner. The smart contracts of the decentralized name service govern how domains are created, managed, and utilized. For example, every domain is issued a non-fungible token on the blockchain that is owned by an owner (e.g., irrevocably—cannot be reclaimed by a central authority and does not need to be renewed). The owner can transfer ownership of the token to transfer ownership of the domain to another user via a compatible wallet, exchange, or marketplace rather than only from a single central authority.

In various embodiments, use of a domain of the decentralized blockchain-based name service to reference web content is supported directly by a web browser, via an intermediary gateway/server, and/or via a browser plugin/extension. In some embodiments, in response to a request received to resolve a name identifier of a web content, it is automatically determined that the domain of the name identifier is to be resolved using a blockchain. For example, a user inputs a Uniform Resource Locator (URL) of a webpage that the user desires to view on a web browser, and because the top level domain of the URL is determined to be associated with a decentralized name service it is automatically determined that the domain of the name identifier is to be resolved using a blockchain of the decentralized name service. A request is sent to a smart contract of the blockchain to obtain one or more resolution records for the domain of the name identifier and these one or more records are received. The received one or more resolution records are used to resolve the domain of the name identifier. For example, the one or more resolution records specify configurations and/or a target destination location/address for the domain of the name identifier and these record(s) are used to resolve the domain to a specified IP address, and redirect to an alternate address, a decentralized web (DWeb) content hash identifier, and/or any other information that can be used to obtain web content referenced by the name identifier.

FIG. 1 is a block diagram illustrating an embodiment of blockchain smart contracts utilized to implement a name service on a blockchain. In some embodiments, the shown blockchain smart contracts are executed by one or more networked computers implementing a distributed blockchain (e.g., one or more computers of blockchain 908 of FIG. 9). Two different types of smart contracts utilized for the name service include a registry smart contract and a resolver smart contract. These smart contracts may be deployed on the Ethereum open-source blockchain but may be deployed in other blockchains in various different embodiments. The registry smart contract can function to map each registered domain to an owner account address and a specific corresponding resolver smart contract that can be used to resolve a name identifier of the domain to a target record (e.g., IP address, cryptocurrency address, etc.). By separating the registry functionality and resolution functionality into different smart contracts, different types of resolver contracts can be linked to a domain, allowing an owner to either use a standard resolver smart contract or a custom resolver smart contract. Multiple different domains of the registry smart contract can point to the same resolver smart contract.

In the example diagram 100 shown in FIG. 1, registry smart contract 102 stores entries associated with three domains. Each of these domains is associated with a non-fungible token stored on a blockchain and associate together a name identifier of each domain to an owner account address and an address of a resolver smart contract that is to be used to resolve the name identifier of the domain. First, two domains of registry smart contract 102 reference the same standard resolver contract 104 that can resolve name identifiers of a plurality of different domains. The third shown domain of registry smart contract 102 references a different custom resolver contract 106 that may function differently from resolver contract 104 in resolving its associated domain(s). Each resolver smart contract includes records for one or more different domains and specifies how and what the name identifier of each domain is to be resolved to corresponding target identifier(s). A single name identifier of one domain may map to a plurality of different target identifiers that are of different types. For example, "alice.crypto" name identifier may resolve to an IP address when requested via a web browser and may resolve to a cryptocurrency address when used as a payment target.

Figure 2:
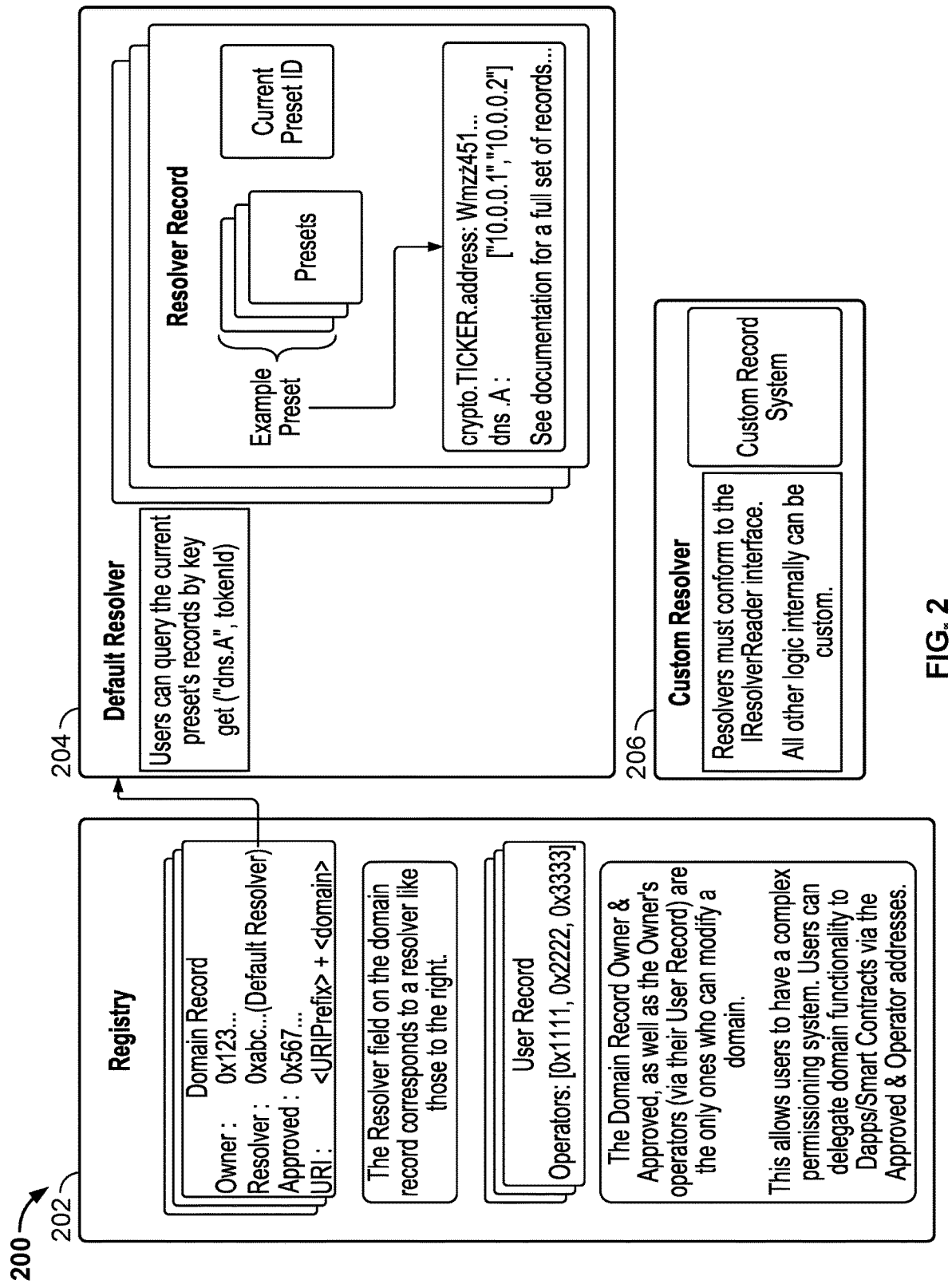
FIG. 2 is a block diagram illustrating additional details of an embodiment of an implementation of blockchain smart contracts of a decentralized name service.

FIG. 2 is a block diagram illustrating additional details of an embodiment of an implementation of blockchain smart contracts of a decentralized name service. In some embodiments, the shown blockchain smart contracts are executed by one or more networked computers implementing a distributed blockchain (e.g., one or more computers of blockchain 908 of FIG. 9). As shown in diagram 200, registry smart contract 202 defines and manages ownership of domains on the blockchain. For example, it defines ownership rules, how new domains are created and transferred, manages the non-fungible token (e.g., ERC-721 token) representing each domain, and stores metadata of domains on the blockchain. Each domain created and managed via registry smart contract 202 is associated with its unique non-fungible token and domain record. In some embodiments, the domain record for a domain stores an account address of the owner of the domain (e.g., user account address), an identifier (e.g., address) of a resolver smart contract assigned to resolve the domain, an optional address of another approved user allowed to manage the specific domain on behalf of the owner, and an identifier of the domain (e.g., hashed version of the name of the domain allowing users to reference the domain record by hashing the name of the domain to obtain the hash that can be used as an identifier of the name of the domain). Users can invoke a program function of registry smart contract 202 to read, modify, and/or manage a domain record of registry smart contract 202.

In the event an owner desires to allow another account to manage every domain owned by the user (e.g., instead of just individual domains), the owner is able to add the account address of another user as an operator in a user record of the owner stored by registry smart contract 202. The added user now becomes that operator for the owner and is able to access and manage every domain of the owner. More than one authorized operator user can be added to the user record of a particular owner. The owner, the approved user, and the authorized operator user of a domain are able to invoke a management function call of registry smart contract 202 to transfer domain ownership, set a new associated resolver smart contract, mint a new subdomain, or destroy the domain. Only the owner account is able to invoke a program function of registry smart contract 202 to add or remove the approved user and the authorized operator.

Each domain of the registry smart contract identifies a corresponding associated resolver smart contract that is used for resolving domains and storing domain records. Using this separate resolver smart contract, domain owners and authorized users can store target records for the name identifier of a domain for resolution (e.g., cryptocurrency addresses, chat IDs, and IPFS hashes for decentralized web webpages, etc.). For example, the resolver smart contract stores in a blockchain the target records of one or more domains and a program function of the registry smart contract is able to be invoked to update a target record or obtain a target record for a domain. Thus, a user is able to use registry smart contract 202 to look up an address of a resolver smart contract for a name of a domain and request to this resolver smart contract a resolution of the name of the domain. A domain of registry smart contract 202 is able to point to any resolver smart contract whether it be a standard/default resolver smart contract (e.g., smart contract 204) that is available to use as a default or a custom resolver smart contract (e.g., smart contract 206) that a user is able to customize and deploy to perform any custom functionality as desired. For example, a smart contract can be programmed to even invoke another smart contract.

A single resolver smart contract may be able to manage and handle resolution of multiple different domains. Default resolver smart contract 204 includes a different preset for different domains and each preset holds records for the domain. For example, the records inside the resolver smart contract are stored as a nested mapping from Domain Token ID→Preset ID→Key→Value. This nested structure allows users to configure domains on the un-enumerable Ethereum mappings (e.g., it is expensive and unreliable to store an enumerable data structure on Ethereum). This allows an authorized user to change the preset associated with a domain to link an entirely different set of records to the domain.

The same name of a domain is able to be resolved into multiple different target records of different types. For example, a request to resolve a name of a domain identifies a desired target identifier or action type and the resolver smart contract looks up and returns a target identifier/action of a particular type among many different types stored by the resolver smart contract for the same domain. Thus resolver smart contract 204 stores in its records for a particular domain, key-value pairs of target identifier/action type keys and target identifier values, allowing the resolver smart contract to effectively map a domain (e.g., hash of a name of the domain) to key-value dictionaries of records.

An example of a list of record types able to be stored and returned/performed by a resolver smart contract includes: a cryptocurrency account address, a preferred browser protocol, a browser redirect URL (e.g., allowing redirection at the name service level), a decentralized web record, an IPFS network content hash, a swarm network content hash, a web Domain Name System (DNS) record, a default DNS time-to-live (TTL) setting, a DNS Canonical Name (CNAME), an IP address, a deprecated record, an account username, a chat user identifier, a social network user identifier, or any communication user identifier.

In some embodiments, the name service does not prohibit an authorized user from assigning any record of a domain to any value. However, a list of known standard records is defined to allow standard interpretation by clients. In some embodiments, standard record types include:

crypto.*—Records related to crypto payments
dns.*—DNS resolution records
dweb.*—Resolution records related to distributed content network protocols
browser.*—Resolution configuration/preference records for web browser The name service allows a human-readable name to be used instead of a destination address for a cryptocurrency payment. Cryptocurrency wallets that use this feature can resolve a domain to an underlying cryptocurrency address in the same way a browser resolves a domain to an IP address. Cryptocurrency addresses are stored in the resolver smart contract within the crypto.*standard namespace of the domain. Each currency address is stored as a "crypto.<TICKER>.address" record. For example, a Bitcoin address is stored in "crypto.BTC.address." Addresses are stored in plain text format according to an address space standard established by each currency. The currency's namespace can contain additional currency-specific attributes to facilitate payment delivery.

Figure 3:
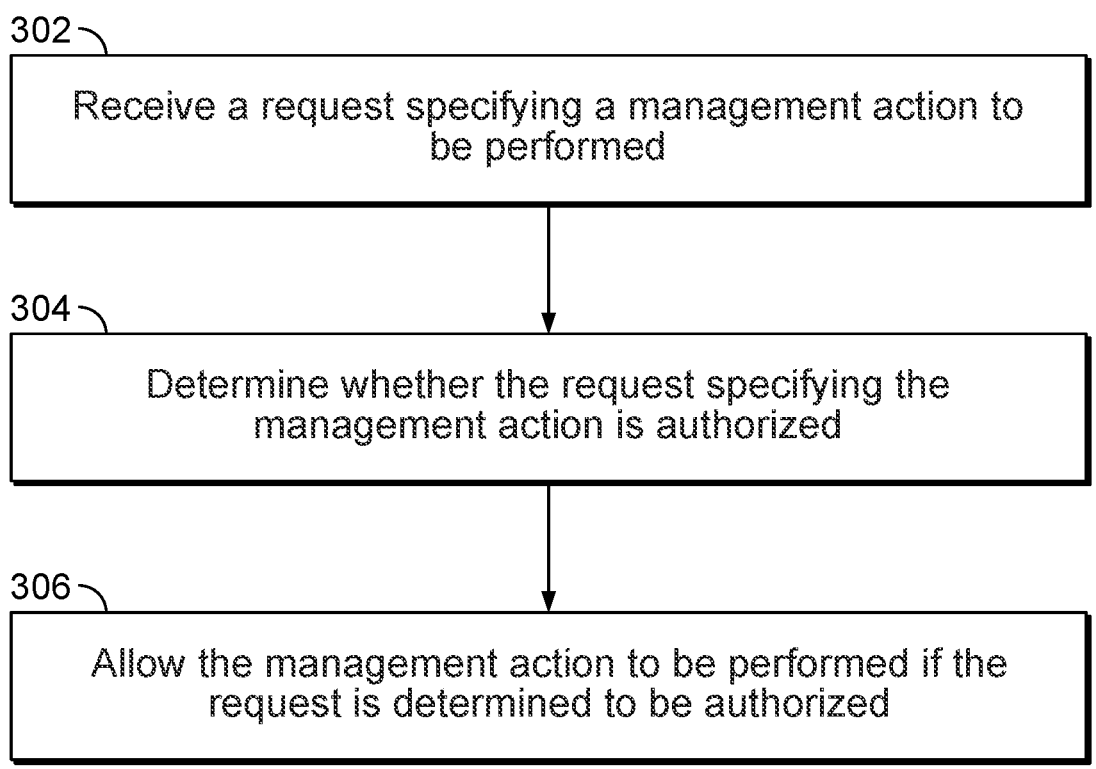
FIG. 3 is a flowchart illustrating an embodiment of a process for managing a domain of a blockchain-based name service.

FIG. 3 is a flowchart illustrating an embodiment of a process for managing a domain of a blockchain-based name service. In some embodiments, at least a portion of the process of FIG. 3 is implemented on management server(s) (e.g., one or more servers of server(s) 904 of FIG. 9) providing a service to manage blockchain-based name service executing on distributed computers of a blockchain. In some embodiments, at least a portion of the process of FIG. 3 is implemented on one or more networked computers implementing a distributed blockchain (e.g., one or more computers of blockchain 908 of FIG. 9). An example of a smart contract that is used to execute the process of FIG. 3 is registry smart contract 102 and/or 202 of FIGS. 1 and 2.

At 302, a request specifying a management action to be performed is received. In some embodiments, the request is made to a registry smart contract by a requester by performing a program function call to an address of the registry smart contract on a blockchain. The management action may be one or more of the following: transfer a domain to a new owner, set a resolver contract for a domain, create a new subdomain for the domain, remove/burn a domain, add or remove an approved account that can control the domain, or add or remove an operator account for an owner that can control every domain owned by the owner (e.g., the request is for an owner account rather than only for a specific domain). The request identifies the domain via a hash identifier (e.g., serves as the identifier of the non-fungible token representing the domain). The hash identifier is a more storage efficient representation of the name of the domain and the name of the domain can be easily converted to a hash identifier using a hash function.

At 304, it is determined whether the request specifying the management action is authorized. The request is authorized to be provided by an owner of a domain, an approved alternative account specified for the domain (e.g., specified using the registry smart contract), or an operator account specified (e.g., using the registry smart contract) to be allowed to control every domain owned by the owner. In order to prove that the user account that provided the request is authentic, the user account can sign the request using a private cryptographic key of the user account and this signature is verified using a public key of the user account to authenticate the user account. If the authenticated user account is an owner, an approved account, or an operator of the domain according to the blockchain record of the registry smart contract, it is determined that the request is authorized. If the account that provided the request cannot be authenticated or the authenticated user account is not authorized for the domain, the request is not authorized.

In some embodiments, an authorized account is able to provide temporary authorization on a per management action transaction level by signing a request message for another account that can provide the request message for later execution when presented. For example, to grant temporary management authority on a per request level via a meta-transaction, an owner, an approved account, or an operator for a domain is able to sign a request using its private cryptographic key and provide it to another user/account that will issue the request for execution when desired. This allows the authorized management of the meta-transaction to be asynchronously executed when desired by the other user/account. In the event the received request is specified as a meta-transaction, the request includes the signature of the authorized account of the domain of the request (different from the account that provided the request) and this signature is verified to ensure it is authentic. If it is authentic and the account that signed it is an owner, an approved account, or an operator for the domain, it is determined that the request is authorized. Otherwise, the meta-transaction request is not authorized. Additional details on meta-transactions are discussed later in the specification in conjunction with FIG. 5.

At 306, the management action is allowed to be performed if the request is determined to be authorized. For example, the domain of the request is transferred to a new owner, a resolver contract is set for the domain, a subdomain is created for the domain, the domain is deleted/burned, an approved account that can control the domain is added or removed, or an operator account for an owner that can control every domain owned by the owner is added or removed.

Figure 4:
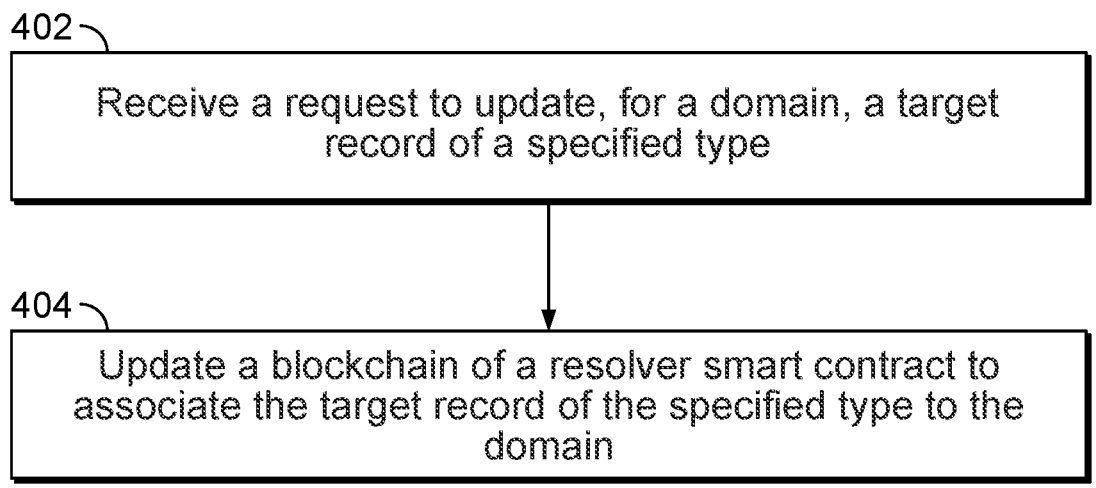
FIG. 4 is a flowchart illustrating an embodiment of a process for updating target records of a domain managed using a blockchain-based name service.

FIG. 4 is a flowchart illustrating an embodiment of a process for updating target records of a domain managed using a blockchain-based name service. In some embodiments, at least a portion of the process of FIG. 4 is implemented on one or more networked computers implementing a distributed blockchain (e.g., one or more computers of blockchain 908 of FIG. 9). In some embodiments, at least a portion of the process of FIG. 4 is implemented on management server(s) (e.g., one or more servers of server(s) 904 of FIG. 9) providing a service to manage blockchain-based name service executing on distributed computers of a blockchain. An example of a smart contract that is used to execute the process of FIG. 4 is resolver smart contract 104 and/or 204 of FIGS. 1 and 2.

At 402, a request to update for a domain, a target record of a specified type is received. In some embodiments, the request is made to a resolver smart contract of the domain by a requester by performing a program function call to an address of the resolver smart contract on a blockchain. In some embodiments, the resolver smart contract for the domain is identified by requesting an address of the resolver smart contract of the domain to a registry smart contract. The request to update a target record identifies the domain via a hash identifier of the name of the domain (e.g., serves as the identifier of the non-fungible token representing the domain).

The same name of a domain is able to be resolved into multiple different target records of different types. For example, a request to resolve a name of a domain identifies a desired target identifier or action type and the resolver smart contract is to look up and return a target identifier/action of a particular type among many different types stored by the resolver smart contract for the same domain. Thus the resolver smart contract is able to store in its records for the particular domain, key-value pairs of target record type keys and target identifier values, allowing the resolver smart contract to effectively map the domain (e.g., hash of a name of the domain) to key-value dictionaries of records. The received request may specify a command to add, modify, or delete the target record of the domain using a target record type (e.g., key) and/or a corresponding data/identifier (e.g., value) specified in the request.

In response to the request, it is determined whether the request is authorized. The request is authorized to be provided by an owner of a domain, an approved alternative account specified for the domain (e.g., specified using the registry smart contract), or an operator account specified (e.g., using the registry smart contract) to be allowed to control every domain owned by the owner. In order to prove that the user account that provided the request is authentic, the user account can authenticate the request using a private cryptographic key of the user account and this signature is verified using a public key of the user account to authenticate the user account. In some embodiments, because the authorized account information is stored in the separate registry smart contract, the registry smart contract is consulted to determine if the authenticated user account is an owner, an approved account, or an operator of the domain according to the blockchain record of the registry smart contract. If the authenticated user account is an authorized user account, it is determined that the request is authorized. If the account that provided the request cannot be authenticated or the authenticated user account is not authorized for the domain, the request is not authorized and the request is rejected.

In some embodiments, the received request is specified as a meta-transaction and the request includes the signature of the authorized account of the domain of the request (different from the account that provided the request) and this signature is verified to ensure it is authentic. If it is authentic and the account that signed it is an owner, an approved account, or an operator for the domain, it is determined that the request is authorized. Otherwise, the meta-transaction request is not authorized. Additional details on meta-transactions are discussed later in the specification in conjunction with FIG. 5.

At 404, a blockchain of a resolver smart contract is updated to associate the target record of the specified type to the domain. A single resolver smart contract may be able to manage and handle resolution of multiple different domains and the resolver smart contract includes a different preset for different domains and each preset holds records for the domain. For example, the records inside the resolver smart contract are stored as a nested mapping from Domain Token ID→Preset ID→Key→Value. This nested structure allows users to configure domains on the un-enumerable Ethereum mappings (e.g., it is expensive and unreliable to store an enumerable data structure on Ethereum), allowing an authorized user to change the preset associated with a domain to link an entirely different set of records to the domain. Using the token identifier of the domain included in a request, the resolver smart contract identifies the corresponding preset and the type and value of the target record (e.g., key/value pair) are updated (e.g., added, removed, or modified) under the identified preset.

An example of a list of record types able to be updated by the resolver smart contract is as follows: a cryptocurrency account address, a preferred browser protocol, a browser redirect URL (e.g., allowing redirection at the name service level), a decentralized web record, an IPFS network content hash, a swarm network content hash, a web DNS record, a default TTL setting, a DNS CNAME, an IP address, a deprecated record, an account username, a chat user identifier, a social network user identifier, or any communication user identifier.

Figure 5:
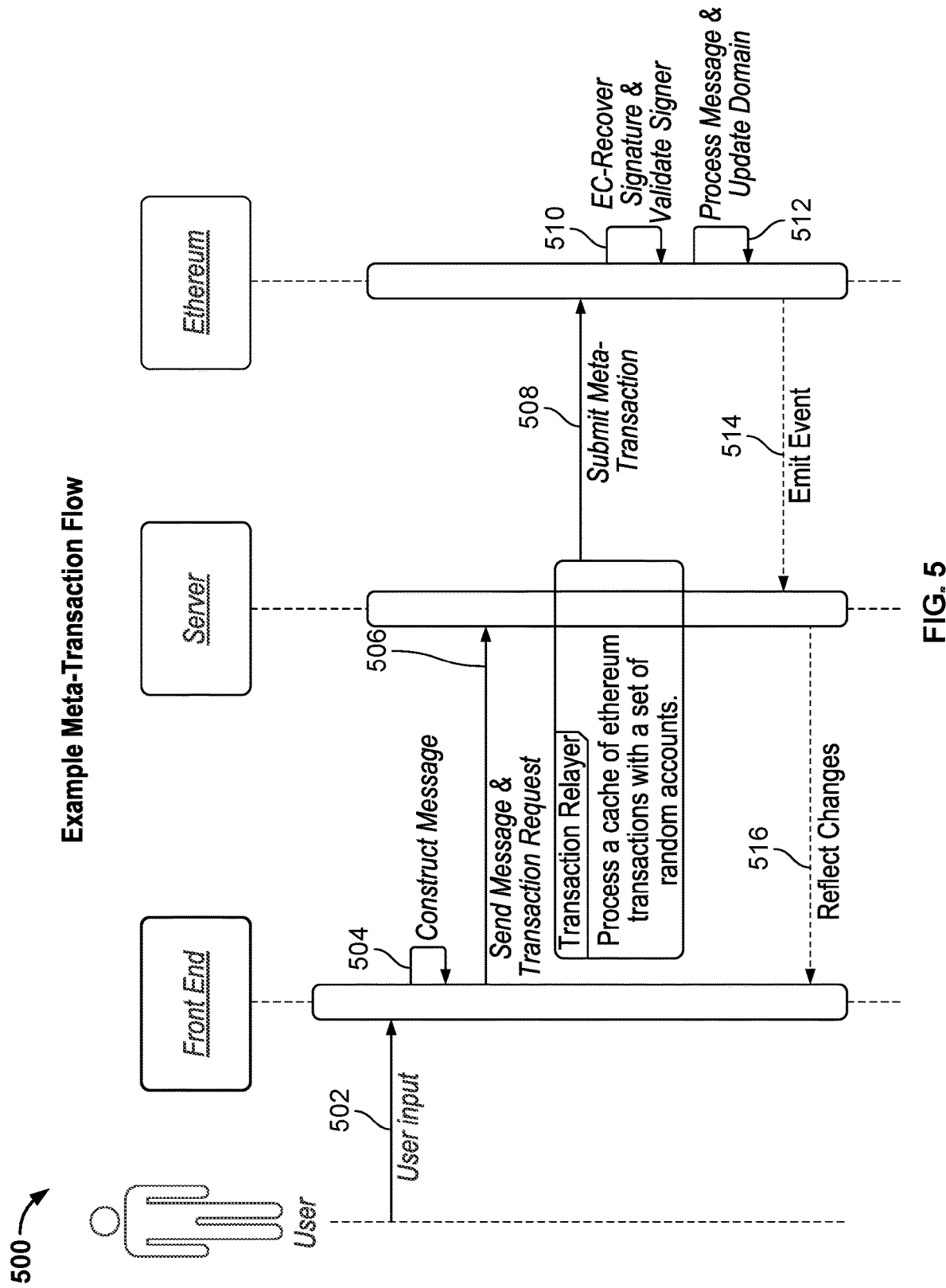
FIG. 5 is a flow diagram illustrating an embodiment of performing a meta-transaction for a domain managed using a blockchain-based name service.

FIG. 5 is a flow diagram illustrating an embodiment of performing a meta-transaction for a domain managed using a blockchain-based name service. Examples of the meta-transaction include the request to the registry smart contract in 302 specifying a management action to be performed and the request to the resolver smart contract in 402 to update for the domain, a target record of a specified type.

In some embodiments, an authorized account for a domain is able to provide authorization on a per management transaction level by signing the request that can be invoked by another account when desired. For example, to grant temporary management authority on a per request level via a meta-transaction, an owner, an approved account, or an operator for a domain is able to sign a request using its private cryptographic key and provide to another user/account that will provide the request for execution when desired. This allows the authorized management of the meta-transaction to be asynchronously executed when desired by the other user/account. In the event the received request is specified as a meta-transaction, the request includes the signature of the authorized account of the domain of the request (different from the account that provided the request) and this signature can be verified to ensure it is authentic. If it is authentic and the account that signed it is an owner, an approved account, or an operator for the domain, it is determined that the request is authorized. Otherwise, the meta-transaction request is not authorized.

In some embodiments, the registry smart contract and/or the resolver smart contract includes special program functions that can be called to indicate that the requested transaction is a meta-transaction. For example, each management function of the smart contracts has a corresponding meta-transaction version that allows as an argument/input to provide a message signed by an authorized account of the domain. This allows a third party to submit transactions on behalf of an authorized account while still allowing the authorized account to still manage its domain in a self-custodial capacity In transaction flow diagram 500 shown in FIG. 5, an authorized account uses the front end (e.g., client 902 of FIG. 9) to indicate, via user input 502 for a domain, a transaction desired to be executed on behalf of the user. In step 504, the front end generates the message specifying and authorizing the meta-transaction. The message identifies the desired action/function desired to be executed by the meta-transaction as well as its parameters. The message is signed using the cryptographic key (e.g., private key) of the authorized account to prove its authenticity.

The message may include a domain based meta-transaction nonce to prevent the message from being replayed (e.g., prevent it from being used more than once). The nonce includes a transaction counter specifically tracked for each domain/token. This prevents replay attacks where a transfer of a token can be replayed over and over to continually revert the state of the name back to a previous state. The nonce counter is incremented by one each time a state transition happens to a token. Domain token-based nonces can be also used to prevent mis-ordering of transactions. For example, this prevents front running non-fungible assets and enables secure transaction batching.

Figure 9:
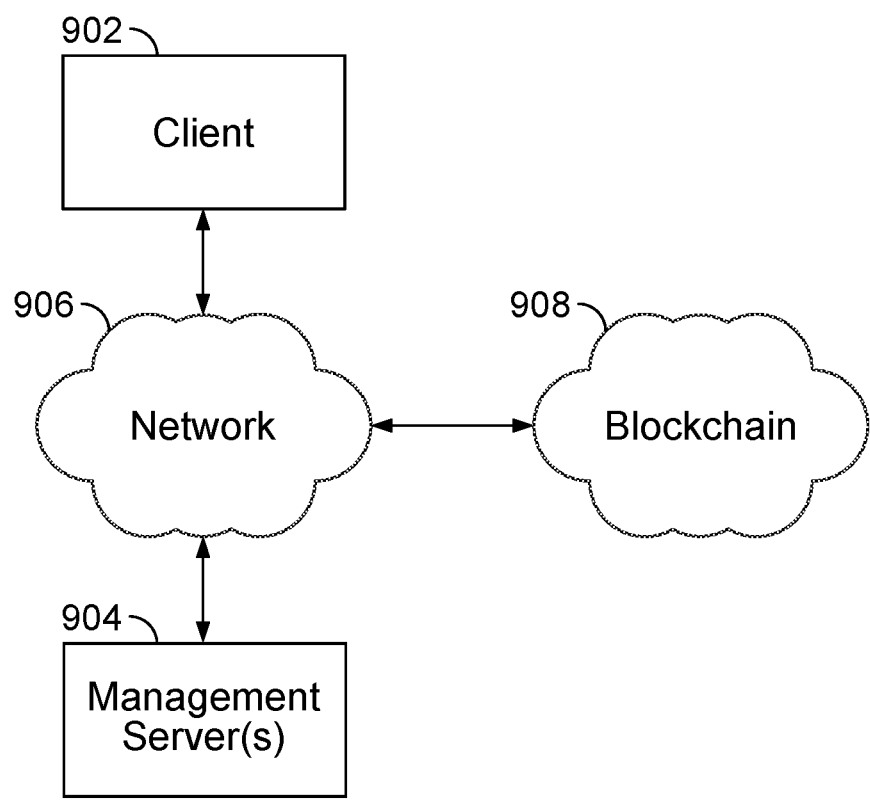
FIG. 9 is a block diagram illustrating an embodiment of a blockchain-based name service environment.

The generated message is included in a transaction request and sent in 506 to the server (e.g., management server(s) 904 of FIG. 9) of the third-party that will be submitting the meta-transaction on behalf of the authorized account of the domain. The server can hold this meta-transaction until later when it desires to execute the transaction by submitting to the appropriate blockchain (e.g., blockchain 908 of FIG. 9) smart contract in 508. This request by the server includes the message signed by the authorized account of the domain and is also signed by the third-party requester submitting the meta-transaction using its cryptographic key to generate its classical signature typically submitted to the blockchain to prove its authenticity.

The blockchain smart contract then checks the authorization to execute the meta-transaction in 510 by verifying that the included message signature purported to be signed by the authorized account (e.g., not the signature of the submitter of the request in 508) was actually signed by an authorized account identified in the record of the registry smart contract for the domain of the request. Once the message signature is verified, the requested transaction is executed in 512 and a confirmation of the execution is passed back in 514 and 516.

Figure 6:
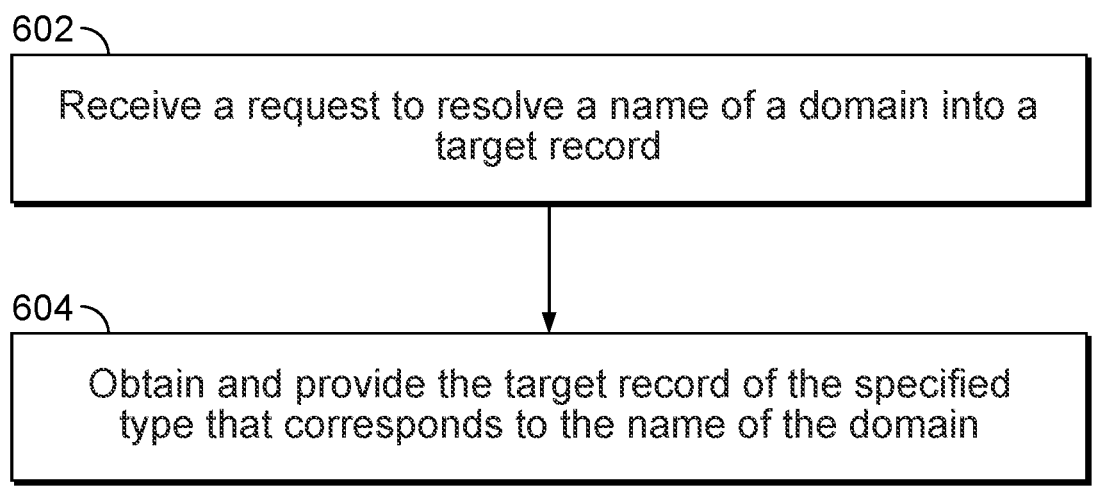
FIG. 6 is a flowchart illustrating an embodiment of a process for resolving a domain managed using a blockchain-based name service.

FIG. 6 is a flowchart illustrating an embodiment of a process for resolving a domain managed using a blockchain-based name service. In some embodiments, at least a portion of the process of FIG. 6 is implemented on one or more networked computers implementing a distributed blockchain (e.g., one or more computers of blockchain 908 of FIG. 9). In some embodiments, at least a portion of the process of FIG. 6 is implemented on management server(s) (e.g., one or more servers of server(s) 904 of FIG. 9) providing a service to manage blockchain-based name service executing on distributed computers of a blockchain. An example of a smart contract that is used to execute the process of FIG. 6 is resolver smart contract 104 and/or 204 of FIGS. 1 and 2.

At 602, a request to resolve a name of a domain into a target record is received. In some embodiments, the request is made to a resolver smart contract of the domain by a requester by performing a program function call to an address of the resolver smart contract on a blockchain. In some embodiments, the resolver smart contract for the domain is identified by requesting an address of the resolver smart contract of the domain to a registry smart contract. The request may identify the name of the domain via a hash identifier determined by hashing the name using a hash function. The request may also identify the type of target record desired to be obtained. For example, the same name of a domain is able to be resolved into multiple different target records of different types, and the request identifies one of these types desired to be obtained.

At 604, the requested target record is obtained and returned in response to the request. For example, the resolver smart contract obtains the target record of a specified type for the domain from its blockchain storage and returns the target record.

In some embodiments, because a single resolver smart contract may be able to manage and handle resolution of multiple different domains, the resolver smart contract includes a different preset for different domains and each preset holds records for the domain. For example, the records inside the resolver smart contract are stored as a nested mapping from Domain Token ID→Preset ID→Key-→Value. This nested structure allows users to configure domains on the un-enumerable Ethereum mappings (e.g., it is expensive and unreliable to store an enumerable data structure on Ethereum), allowing an authorized user to change the preset associated with a domain to link an entirely different set of records to the domain. Using the token identifier of the domain included in a request, the resolver smart contract identifies the corresponding preset of the domain, obtains the target record of the type (e.g., key of the record) specified by the request, and returns the value of the record. Examples of the return target record returned include: a cryptocurrency account address, a preferred browser protocol, a browser redirect URL (e.g., allowing redirection at the name service level), a decentralized web record, an IPFS network content hash, a swarm network content hash, a web DNS record, a default TTL setting, a DNS CNAME, an IP address, a deprecated record, an account username, a chat user identifier, a social network user identifier, or any communication user identifier.

Figure 7:
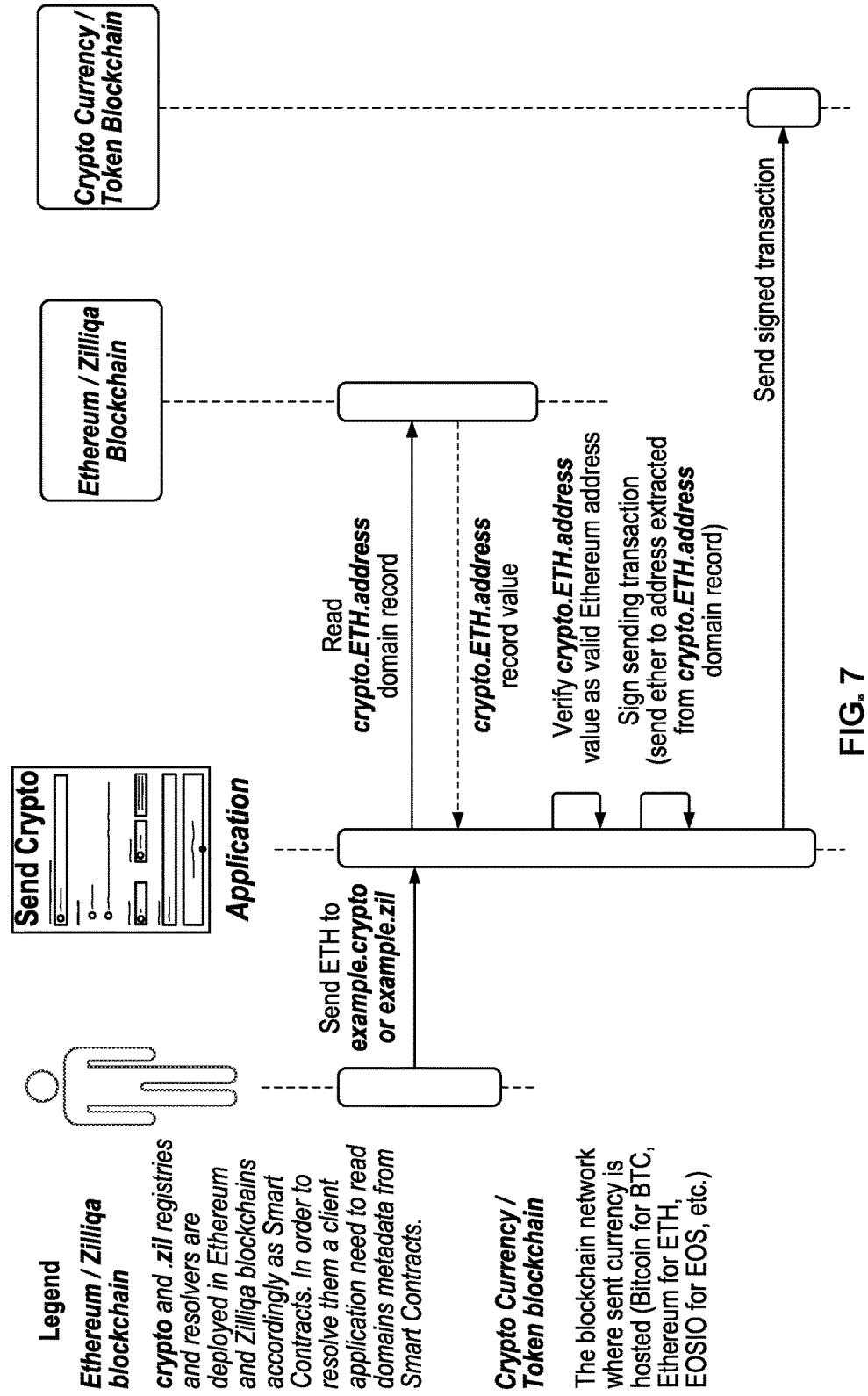
FIG. 7 is a flow diagram illustrating an embodiment of resolving a name identifier using a blockchain-based name service for a cryptocurrency transaction.

FIG. 7 is a flow diagram illustrating an embodiment of resolving a name identifier using a blockchain-based name service for a cryptocurrency transaction. An example of a smart contract that is used to execute the flow of FIG. 7 is resolver smart contract 104 and/or 204 of FIGS. 1 and 2.

One way to integrate with the name service is through resolution of the name of the domain into a cryptocurrency address. This process converts a human-readable name like "brad.crypto" to the cryptocurrency addresses that the name service stores in its blockchain. For example, a user can send a bitcoin to "brad.crypto" and it will go to Brad's bitcoin address. A user can also send an Ethereum coin to "brad.crypto" and it will go to Brad's Ethereum address.

In the example shown in diagram 700, the application retrieves a domain's records through a resolver smart contract deployed on the blockchain (e.g., via the Ethereum or Zilliqa blockchains). In the shown diagram, an ETH cryptocurrency token is being sent to "example.crypto." The application sends those two parameters to the resolver smart contract on the Ethereum blockchain and it returns the record stored under "crypto.ETH.address" for that domain. This address can be used to complete the ETH cryptocurrency token transfer.

Figure 8:
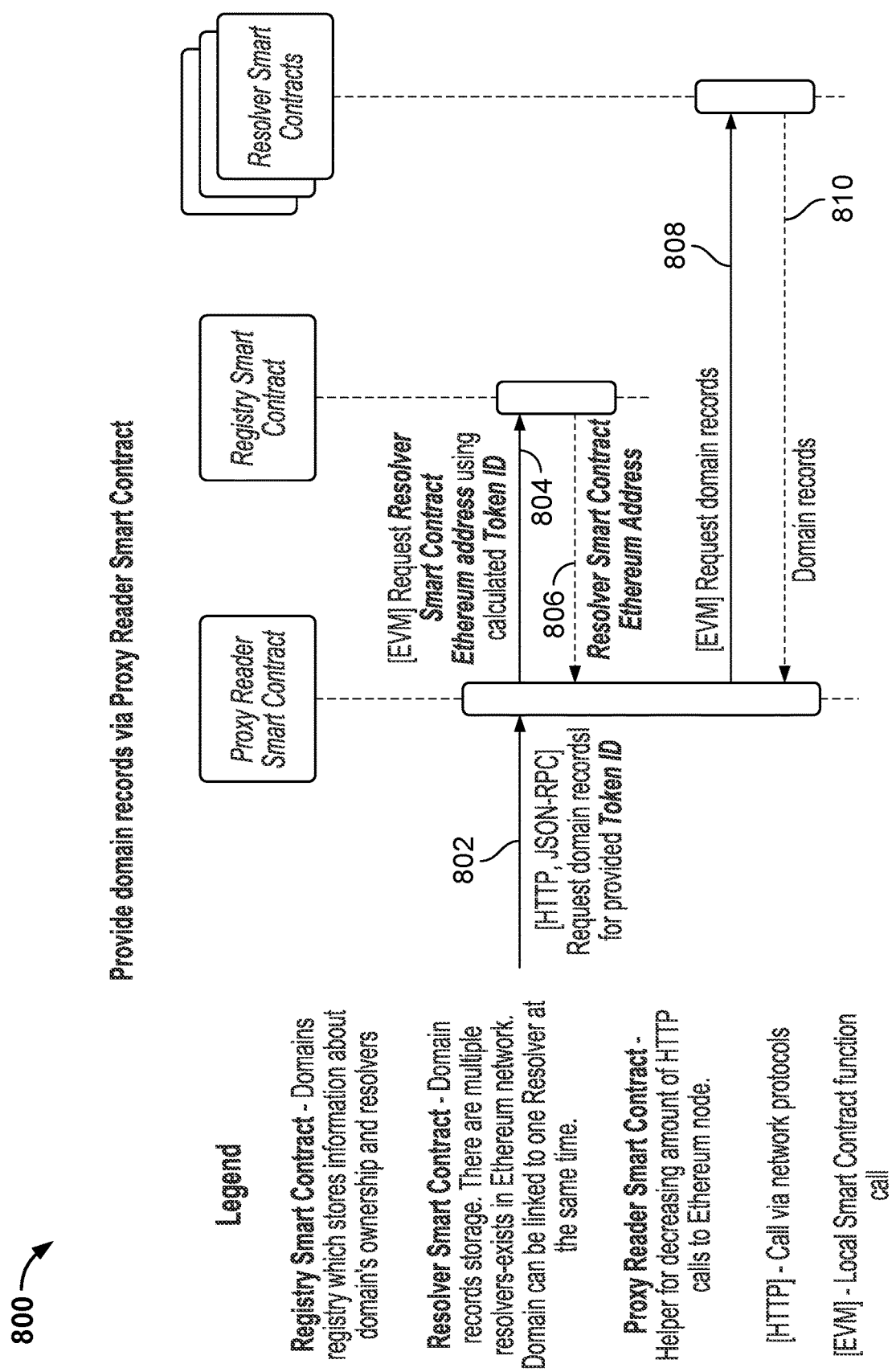
FIG. 8 is a flow diagram illustrating an embodiment of using a proxy reader smart contract to resolve a target record of a domain managed using a blockchain-based name service.

FIG. 8 is a flow diagram illustrating an embodiment of using a proxy reader smart contract to resolve a target record of a domain managed using a blockchain-based name service. In some embodiments, at least a portion of the process of FIG. 8 is implemented on one or more networked computers implementing a distributed blockchain (e.g., one or more computers of blockchain 908 of FIG. 9). In the previously described examples of the registry smart contract (e.g., registry smart contract 102 and/or 202 of FIGS. 1 and 2) and the resolver smart contract (e.g., resolver smart contract 104 and/or 204 of FIGS. 1 and 2), an application/user desiring to resolve a name of the domain made a first program function call to the registry smart contract to obtain the address of the resolver smart contract for the domain and then made a second function call to the resolver smart contract to obtain the target domain record. However, making two different function calls to two different smart contracts adds complexity to the name service that is undesirable for many users. In order to simplify the resolution of the domain, a proxy reader smart contract that enables a single function call to handle this complexity for the user is shown in diagram 800.

The proxy reader smart contract receives request 802 to resolve a name of a domain into a target record (e.g., the request received in 502 of FIG. 5). Request 802 may include a hash of the name of the domain (e.g., Token ID) and an identifier of a type of target record desired to be obtained. The proxy reader smart contract acts as a proxy to make the appropriate calls to both the registry smart contract and the corresponding resolver smart contract, allowing the requester to make a single call that returns the desired domain record. The proxy reader smart contract makes call 804 to the registry smart contract to request the address of the resolver smart contract corresponding to the domain (e.g., corresponding to the Token ID of the domain). The registry smart contract returns response 806 providing the corresponding resolver smart contract address. The proxy reader smart contract makes call 808 to the obtained resolver smart contract address to request the desired record of the domain. The resolver smart contract returns response 810 that provides the desired record. This obtained record is then able to be provided by the proxy reader smart contract to the requester in response to request 802.

FIG. 9 is a block diagram illustrating an embodiment of a blockchain-based name service environment. Client 902 includes any computer using the blockchain-based name service. For example, client 902 requests resolution of a name of a domain of the blockchain-based name service to a target record, updates a target record for a name of a domain of the blockchain-based name service, and/or performs any management action associated with a domain of the blockchain-based name service. Any number of client 902 may exist. A request sent by client 902 is provided to management server(s) 904 and/or blockchain 908 via computer network 906. Management server(s) 904 includes one or more servers providing a service to manage the blockchain-based name service executing on blockchain 908. For example, rather than directly managing the blockchain-based name service on blockchain 908, an owner of a domain uses a service provided by management server(s) 904 to assist the owner by performing management actions on blockchain 908 for the owner. The owner may grant management server(s) 904 authorization to manage its domain(s) (e.g., via as an approved user, as an operator, or per management action meta-transaction). This allows a management action request received at management server(s) 904 from client 904 to be initiated by management server(s) 904 on blockchain 908. Blockchain 908 includes one or more distributed network(s) of servers and computers implementing a crypto blockchain (e.g., Ethereum blockchain) that enable smart contracts of the blockchain-based name service to be executed.

Figure 10:
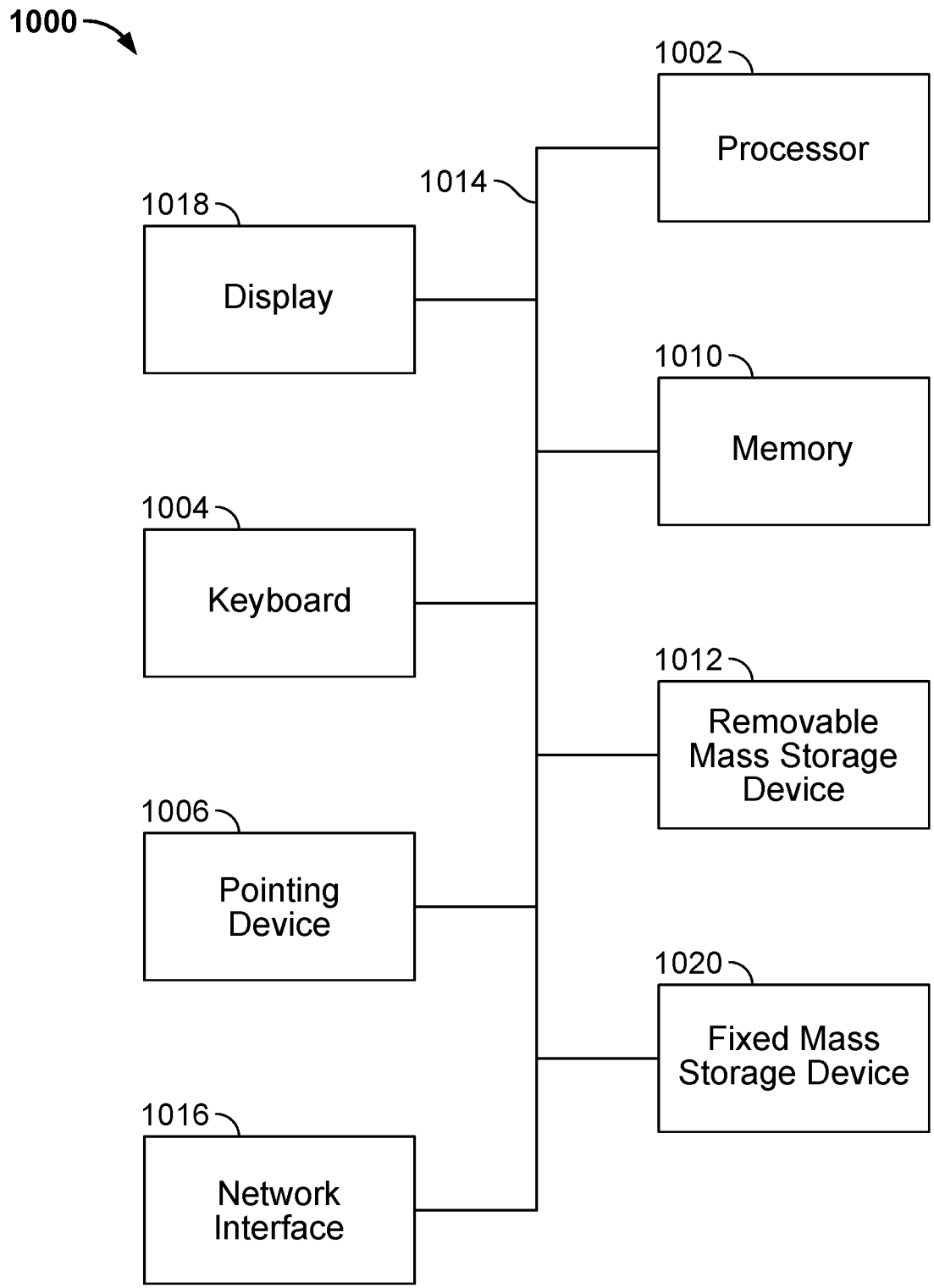
FIG. 10 is a functional diagram illustrating a programmed computer system for using, managing, or executing a blockchain-based name service in accordance with some embodiments.

FIG. 10 is a functional diagram illustrating a programmed computer system for using, managing, or executing a blockchain-based name service in accordance with some embodiments. As will be apparent, other computer system architectures and configurations can be used to use, manage, or execute the blockchain-based name service. Examples of computer system 1000 includes client 902, one or more computers included in management server(s) 904, or one or more computers included in blockchain 908 of FIG. 9. Computer system 1000, which includes various subsystems as described below, includes at least one microprocessor subsystem (also referred to as a processor or a central processing unit (CPU)) 1002. For example, processor 1002 can be implemented by a single-chip processor or by multiple processors. In some embodiments, processor 1002 is a general purpose digital processor that controls the operation of the computer system 1000. Using instructions retrieved from memory 1010, the processor 1002 controls the reception and manipulation of input data, and the output and display of data on output devices (e.g., display 1018).

Processor 1002 is coupled bi-directionally with memory 1010, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1002. Also as is well known in the art, primary storage typically includes basic operating instructions, program code, data and objects used by the processor 1002 to perform its functions (e.g., programmed instructions). For example, memory 1010 can include any suitable computer-readable storage media, described below, depending on whether, for example, data access needs to be bi-directional or unidirectional. For example, processor 1002 can also directly and very rapidly retrieve and store frequently needed data in a cache memory (not shown).

A removable mass storage device 1012 provides additional data storage capacity for the computer system 1000, and is coupled either bi-directionally (read/write) or unidirectionally (read only) to processor 1002. For example, storage 1012 can also include computer-readable media such as magnetic tape, flash memory, PC-CARDS, portable mass storage devices, holographic storage devices, and other storage devices. A fixed mass storage 1020 can also, for example, provide additional data storage capacity. The most common example of mass storage 1020 is a hard disk drive. Mass storage 1012, 1020 generally store additional programming instructions, data, and the like that typically are not in active use by the processor 1002. It will be appreciated that the information retained within mass storage 1012 and 1020 can be incorporated, if needed, in standard fashion as part of memory 1010 (e.g., RAM) as virtual memory.

In addition to providing processor 1002 access to storage subsystems, bus 1014 can also be used to provide access to other subsystems and devices. As shown, these can include a display monitor 1018, a network interface 1016, a keyboard 1004, and a pointing device 1006, as well as an auxiliary input/output device interface, a sound card, speakers, and other subsystems as needed. For example, the pointing device 1006 can be a mouse, stylus, track ball, or tablet, and is useful for interacting with a graphical user interface.

The network interface 1016 allows processor 1002 to be coupled to another computer, computer network, or telecommunications network using a network connection as shown. For example, through the network interface 1016, the processor 1002 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1002 can be used to connect the computer system 1000 to an external network and transfer data according to standard protocols. For example, various process embodiments disclosed herein can be executed on processor 1002, or can be performed across a network such as the Internet, intranet networks, or local area networks, in conjunction with a remote processor that shares a portion of the processing. Additional mass storage devices (not shown) can also be connected to processor 1002 through network interface 1016.

An auxiliary I/O device interface (not shown) can be used in conjunction with computer system 1000. The auxiliary I/O device interface can include general and customized interfaces that allow the processor 1002 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 10 is but an example of a computer system suitable for use with the various embodiments disclosed herein. Other computer systems suitable for such use can include additional or fewer subsystems. In addition, bus 1014 is illustrative of any interconnection scheme serving to link the subsystems. Other computer architectures having different configurations of subsystems can also be utilized.

Figure 11:
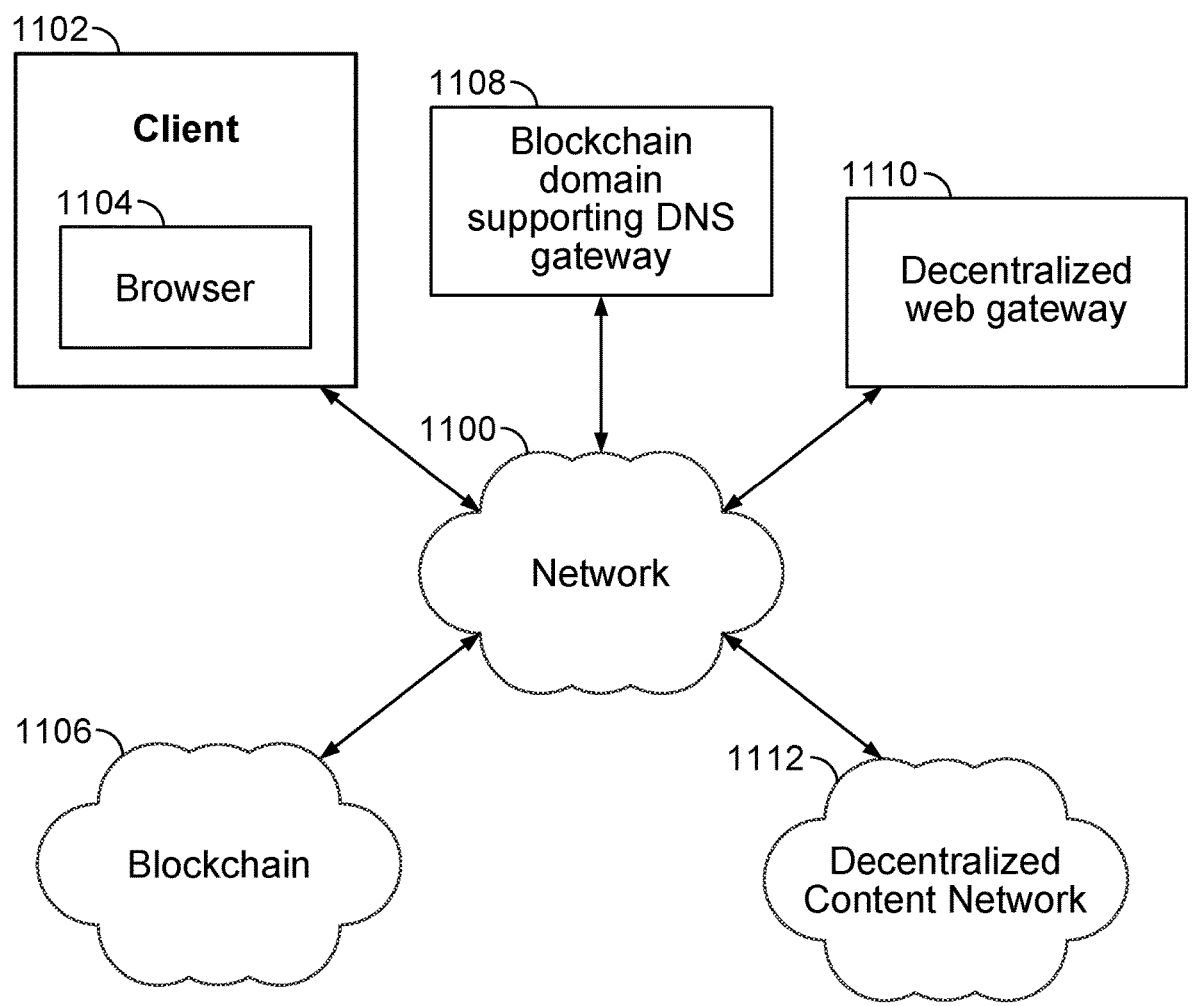
FIG. 11 is a block diagram illustrating an embodiment of a system for resolving a name of a domain of a decentralized blockchain-based name service.

FIG. 11 is a block diagram illustrating an embodiment of a system for resolving a name of a domain of a decentralized blockchain-based name service. Client 1102 includes web browser 1104. A user uses web browser 1104 executing on client 1102 (e.g., computer, mobile device, etc.) to request content referenced by a name identifier including a domain name. For example, the name identifier includes a human-friendly hostname/URL (Uniform Resource Locator) that is to be resolved to obtain a target identifier (e.g., IP address) that is to be used to request the desired content. Traditional domains that are not blockchain based are typically resolved by web browser 1104 by contacting a Domain Name System (DNS) server to obtain a DNS record corresponding to a domain name. However in various embodiments, a name of a domain of a blockchain-based name service is to be resolved by a lookup of a corresponding record on a blockchain. For example, the process of FIG. 6 is used to request and obtain target records for a domain of a blockchain-based name service.

In some embodiments, web browser 1104 has been specifically configured to natively handle resolution of a name of a domain of a blockchain-based name service by natively performing a lookup of a corresponding record managed on a blockchain. For example, when web browser 1104 detects that a provided content location identifier (e.g., URL) for a requested content includes a name of a domain of a blockchain-based name service, web browser 1104 contacts blockchain 1106 of the blockchain-based name service (e.g., via a smart contract) via network 1100 to obtain one or more records corresponding to the domain of the provided content location identifier. In various embodiments, the record(s) provide configuration information (e.g., preferred protocol), DNS record(s), target IP address, redirection information, or any other stored information that can be used to obtain content referenced using the domain of the blockchain-based name service. FIG. 2 and related descriptions detail an embodiment of an implementation of blockchain smart contracts of a decentralized blockchain-based name service.

In some embodiments, web browser 1104 is unable to natively handle resolution of a name of a domain of a blockchain-based name service and a browser extension or a browser plugin that has been installed on web browser 1104 is utilized to handle the resolution of the name of the domain of the blockchain-based name service. For example, when the plugin detects that a provided content location identifier for a requested content includes a name of a domain of a blockchain-based name service, the plugin of web browser 1104 contacts blockchain 1106 of the blockchain-based name service (e.g., via a smart contract) via network 1100 to obtain one or more records corresponding to the domain of the provided content location identifier. In various embodiments, the record(s) provide configuration information (e.g., preferred protocol), DNS record(s), target IP address, redirection information, or any other stored information that can be used to obtain content referenced using the domain of the blockchain-based name service. FIG. 2 and related descriptions detail an embodiment of an implementation of blockchain smart contracts of a decentralized blockchain-based name service.

In some embodiments, rather than requiring native handling, browser extension, or a plugin-based resolution of a name of a domain of a blockchain-based name service, the resolution is performed via a remote server/gateway. For example, regardless of whether a domain to be resolved is a traditional DNS domain or a domain of a blockchain-based name service, attempts to perform resolution of a name of a domain of a blockchain-based name service are performed by contacting a remote gateway/server that will perform the resolution for the web browser. For example, browser 1104 contacts blockchain domain supporting DNS gateway 1108 to resolve a name of a domain included in a content location identifier (e.g., URL). DNS gateway 1108 supports resolutions of both traditional DNS domains and domains of a blockchain-based name service, and it is configured to determine whether a name of the domain to be resolved is a domain of a blockchain-based name service (e.g., based on a top level domain identifier of the domain to be resolved). For example, the DNS gateway is configured to access records managed on blockchain 1106 for the domain and provide resolution records. Even if the domain to be resolved is a blockchain-based domain, the records may be provided in conformance with the traditional DNS standard protocol to the web browser that only understands traditional DNS responses. For example, from the perspective of a web browser, DNS gateway 1108 functions as a traditional DNS gateway/server despite it being extended to support blockchain-based domains. In the event the domain is a domain of a blockchain-based name service, DNS gateway 1108 contacts blockchain 1106 of the blockchain-based name service (e.g., via a smart contract) via network 1100 to obtain one or more records corresponding to the domain to be resolved. In various embodiments, the record(s) provide configuration information (e.g., preferred protocol), DNS record, target IP address, redirection information, or any other stored information that can be used to obtain content referenced using the domain of the blockchain-based name service. The resolution response is returned to browser 1104 by DNS gateway 1108 based on the obtained record(s) from the blockchain. If it is determined that the domain is not a domain of a blockchain-based name service but a standard domain (e.g., managed by ICANN) that is not a blockchain-based domain, DNS gateway 1108 performs the resolution as would be performed by a typical DNS server/gateway without using a blockchain.

In some embodiments, one or more of the record(s) obtained from the blockchain for domain resolution specify a decentralized web content identifier that can be used to obtain content from decentralized content network 1112. For example, one of the record(s) obtained from the blockchain includes an InterPlanetary File System (IPFS) content hash identifier. Decentralized content network 1112 includes one or more servers and/or devices that function as peer-to-peer networks to provide content in a distributed manner. In some embodiments, one or more of the record(s) obtained from the blockchain for domain resolution include an address of a gateway/server (e.g., decentralized web gateway 1110) that functions as a proxy to obtain and provide requested decentralized web content for a requester that does not directly support a decentralized web protocol. For example, web browser 1104 may not support a decentralized web content protocol such as IPFS, and the web browser is provided in a record returned from resolving a domain referencing decentralized web content, a redirect address to decentralized web gateway 1110. When decentralized web gateway 1110 is contacted via the redirect address, decentralized web gateway 1110 can function as a proxy to contact decentralized content network 1112 to obtain and provide the content referenced by a decentralized web content hash identifier included in a record obtained from the blockchain for the domain. In effect, decentralized web gateway 1110 functions as a middle proxy server that allows decentralized web content to be requested and received by a requester utilizing traditional requests/responses (e.g., HTTP requests/responses) not utilizing a decentralized web protocol.

Blockchain 1106 includes a network of computers, servers, or other devices that maintain a blockchain ledger and execute smart contracts that maintain and execute the blockchain-based name service. For example, Blockchain 1106 includes devices that maintain and execute the Ethereum blockchain. Examples of use and management of the blockchain have been described previously in the specification.

Figure 12:
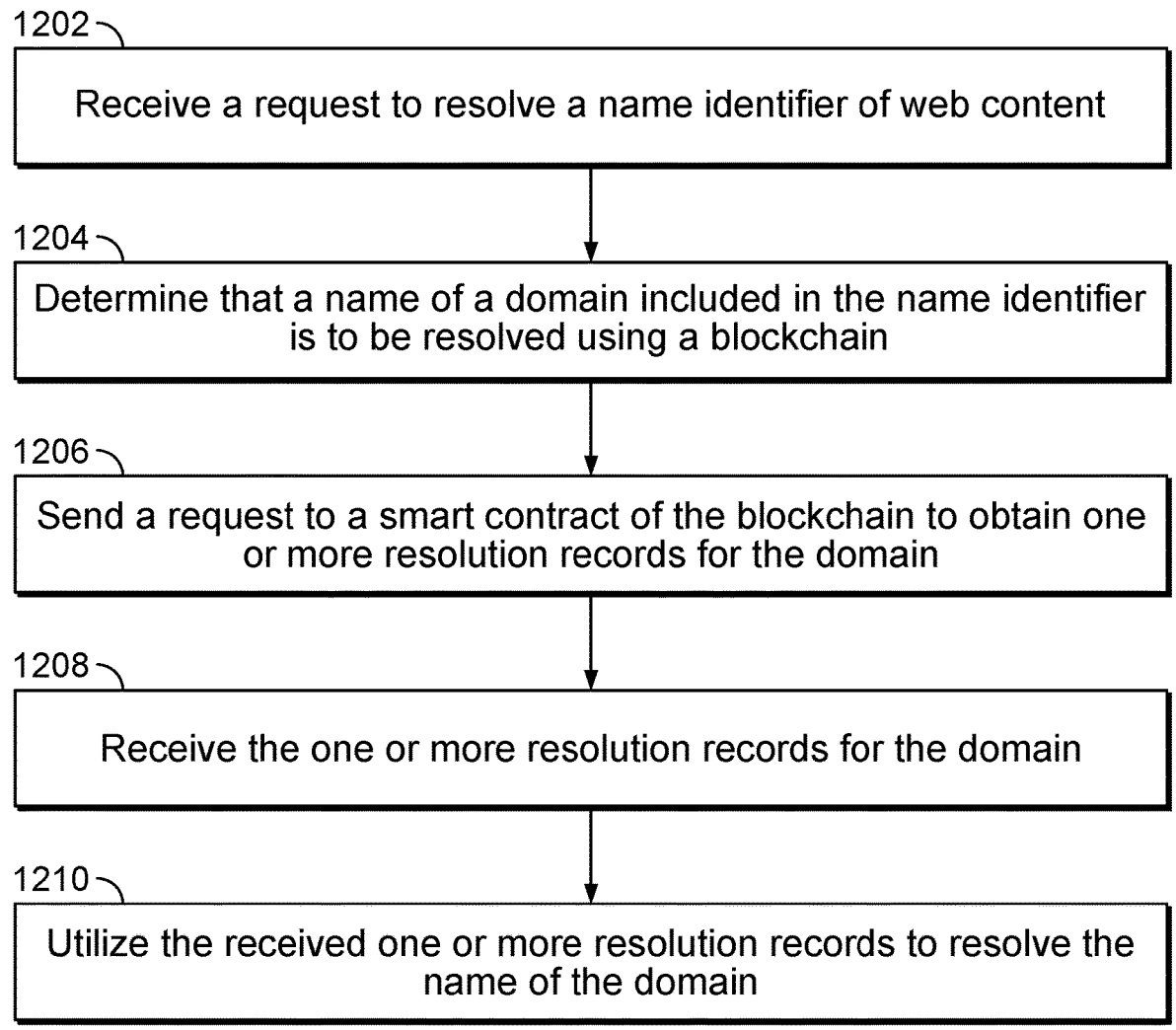
FIG. 12 is a flowchart illustrating an embodiment of a process for resolving a name identifier.

FIG. 12 is a flowchart illustrating an embodiment of a process for resolving a name identifier. In some embodiments, at least a portion of the process of FIG. 12 is performed by web browser 1104 of FIG. 11. In some embodiments, at least a portion of the process of FIG. 12 is performed by a browser plugin and/or browser extension of web browser 1104 of FIG. 11. In some embodiments, at least a portion of the process of FIG. 12 is performed by DNS gateway 1108 of FIG. 11.

At 1202, a request to resolve a name identifier of web content is received. For example, a user inputs the name identifier into an address bar of a web browser. In another example, the name identifier is referenced by web content or another program for retrieval of the web resource referenced by the name identifier. In some embodiments, the request is received by the native component of the web browser and/or a plugin/extension of the web browser. In some embodiments, the request is provided by a web browser and received at a domain name resolution server/gateway (e.g., DNS gateway 1108). Examples of the web content include a webpage, an image, program code, content referenced by a webpage, or any other content able to be referenced and obtained via the internet.

At 1204, it is determined that a name of a domain included in the name identifier is to be resolved using a blockchain. While existing traditional DNS domains are to be resolved using traditional DNS servers, certain domains are to be resolved using the blockchain of a blockchain-based name service. In some embodiments, the determination on whether to resolve the name of the domain using a blockchain is performed automatically based on a programmatic analysis of its domain extension or top-level domain (e.g., letters at end of domain name after dot). In some embodiments, there exists a predetermined list of one or more specific domain extensions/top-level domains to be resolved using a blockchain, and if the extension/top-level domain of the name of the domain to be resolved matches an entry on this list, it is determined that the name of the domain included in the name identifier is to be resolved using a blockchain. For example, extensions/top-level domains ".crypto" and ".zil", etc. are included in the list and if the domain of the name identifier includes any of these top-level domains, it is automatically determined to resolve it using a blockchain. If the domain of the name identifier does not include any of these top-level domains, it is automatically determined to resolve it using traditional non-blockchain based resolution (e.g., via traditional DNS resolution).

At 1206, a request is made to a smart contract of the blockchain for one or more resolution records for the domain, and at 1208, the requested record(s) are received. For example a call is made to a function of the smart contract to request resolution records of a specified domain. Examples of the smart contract are shown in FIGS. 1 and 2. In some embodiments, the request is made using the process of FIG. 6. The smart contract includes self-executing code that functions to implement an agreement deployed to store state and execute code on the blockchain. This allows an agreed upon contract code to execute in a distributed and verifiable manner. The smart contracts of the decentralized blockchain-based name service govern how domains are created, managed, and utilized. For example, the smart contract can be invoked to obtain one or more records that can be used to resolve the domain of the name identifier to obtain the corresponding web resource. In some embodiments, when the request is made to the smart contract of the blockchain, the smart contract returns the one or more resolution records managed in the blockchain for the domain of the name identifier to be resolved.

Examples of the resolution records include any traditional DNS record (e.g., redirect address/URL of a redirect record, IP address of a dns. A record, or any other record supported by the DNS protocol), any decentralized web record (e.g., hash value of any supported decentralized web protocol), and configuration record(s) (e.g., record specifying a list of preferred protocols in a preferred order such that if multiple protocols are supported by the destination of the resolved domain, the protocol to be utilized is selected based on the order of the list).

At 1210, the received one or more records are used to resolve the name of the domain of the name identifier and obtain the referenced web content. In some embodiments, the names of the domain in the name identifier are replaced with an IP address included in the record(s) and used to request and obtain the web resource via the Internet. In some embodiments, a redirect address included in the received record(s) is used to perform a DNS redirection by requesting content of the redirect address instead. In some embodiments, a decentralized web content hash identifier included in the received record(s) is used to request and obtain decentralized web content from a distributed content network. Preferences and configurations for requesting and obtaining the referenced web content may be specified in the received one or more records.

Figure 13:
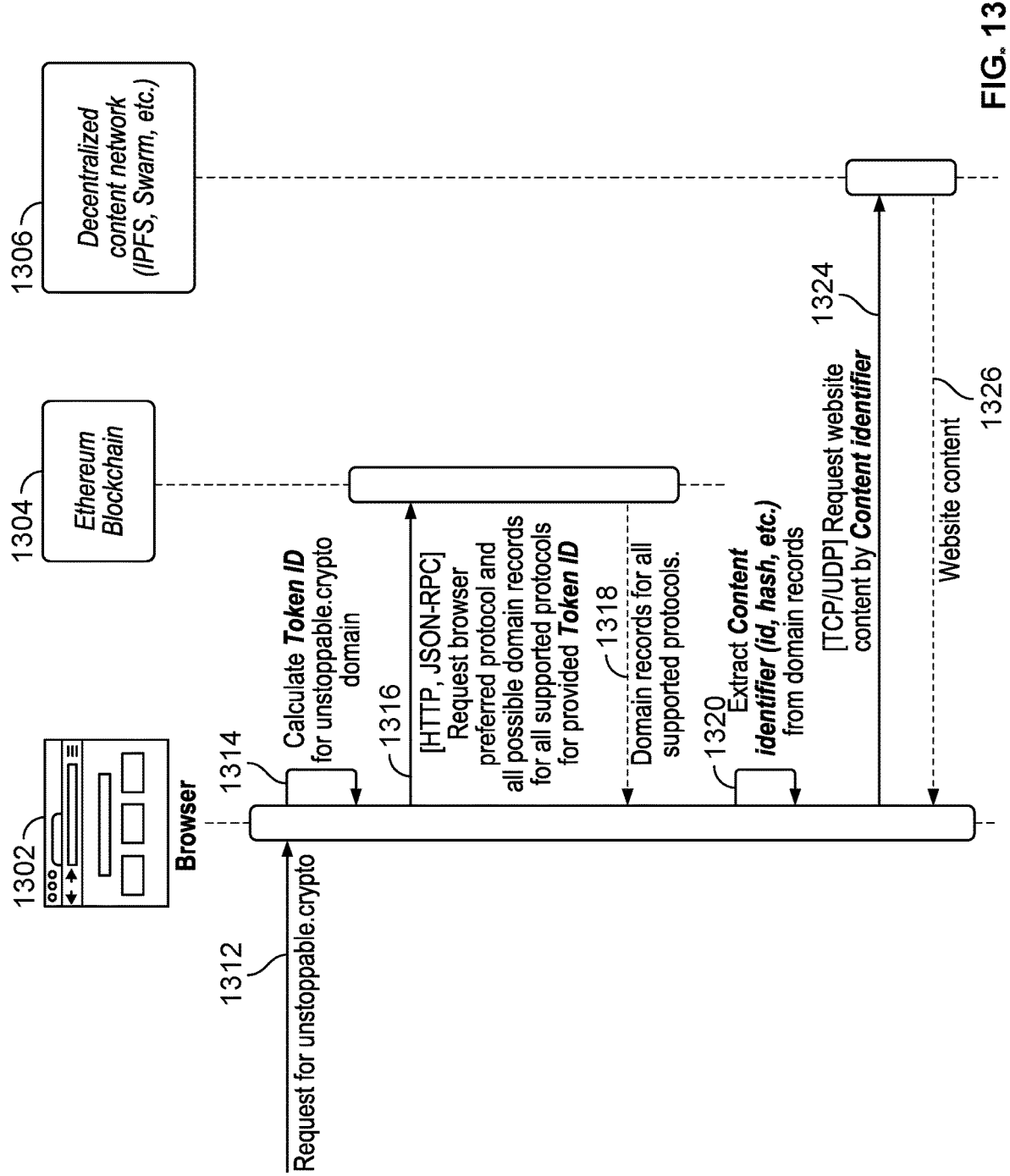
FIG. 13 is a flow diagram illustrating an embodiment of a process for requesting and receiving decentralized web (dWeb) content.

FIG. 13 is a flow diagram illustrating an embodiment of a process for requesting and receiving decentralized web (dWeb) content. An example of web browser 1302 is web browser 1104 of FIG. 11. An example of blockchain 1304 is blockchain 1106 of FIG. 11. An example of decentralized content network 1306 is decentralized content network 1112 of FIG. 11.

In the example flow diagram shown, at 1312, a user requests content referenced by a provided name identifier "unstoppable.crypto." This provided name identifier may have been provided as a user input into the address bar of a web browser. A native component or a plugin/extension component of the web browser is configured to detect that the ".crypto" portion of the name of the domain of the provided name identifier is to be resolved using a blockchain of a blockchain-based name service.

At 1314, a token version of the name of the domain of the provided name identifier is calculated. For example, rather than using the text version of the domain, a hash identifier is calculated by hashing the text of the domain. The hash identifier serves as the identifier of the non-fungible token representing the domain and is a more storage efficient representation of the name of the domain and the name of the domain can be easily converted to a hash identifier using a hash function.

At 1316, target records for the domain (identified by the calculated hash) are requested from blockchain 1304 (e.g., blockchain of a blockchain-based name service able to resolve the top-level domain of the domain). For example, a request is sent to a smart contract of the blockchain requesting resolution records associated with resolving and accessing content associated with the domain of the name identifier.

At 1318, the requested records are received. The received records may include configuration record(s) as well as target location/content records of the domain for any supported protocol.

At 1320, the decentralized web content identifier is extracted from the received records. For example, a decentralized web content hash identifier for a decentralized web protocol identified as supported from the received records is obtained from the received records.

At 1324, decentralized web content identified by the extracted decentralized web target content identifier is requested from decentralized content network 1306. At 1326, the requested decentralized web content is received from decentralized content network 1306.

Figure 14:
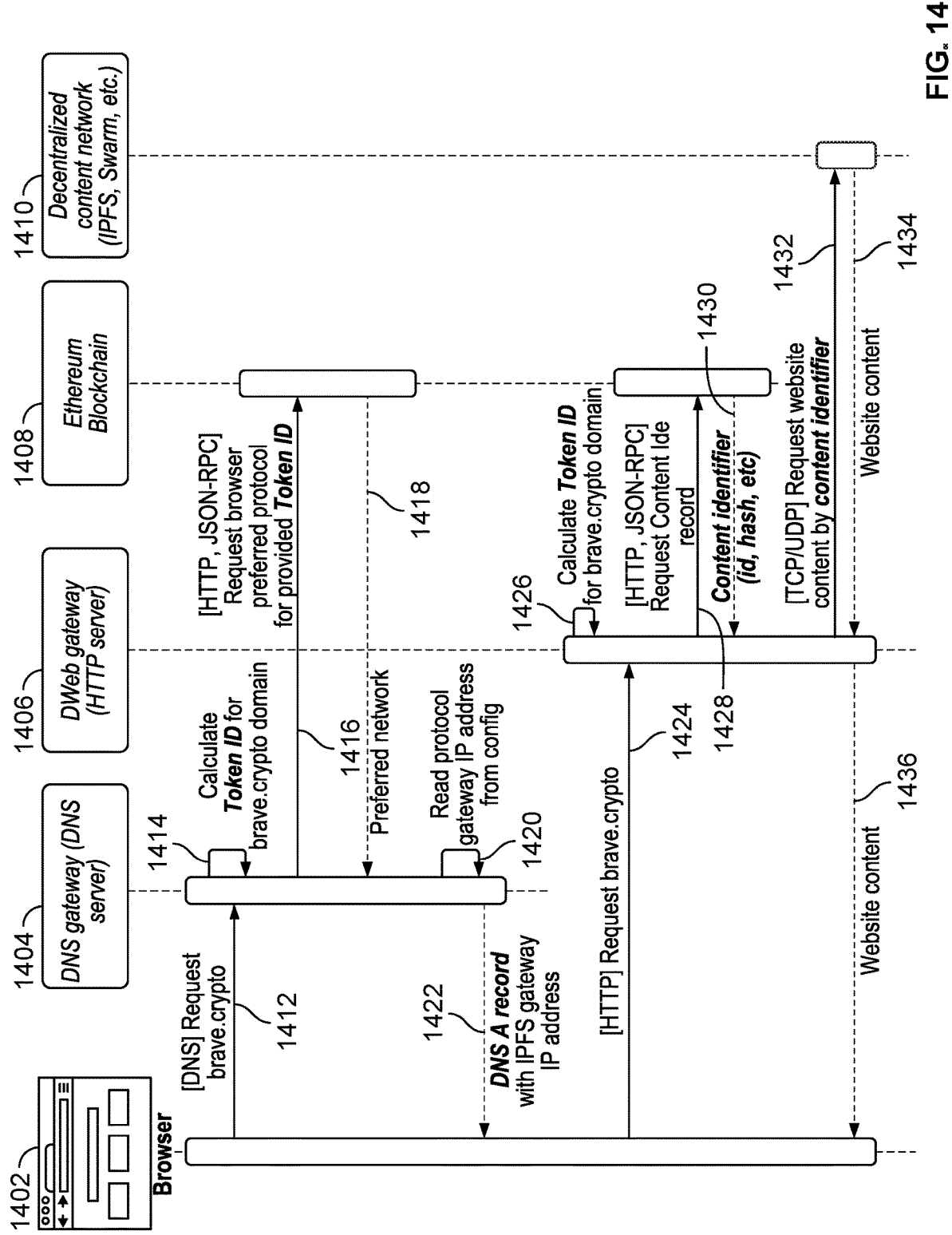
FIG. 14 is a flow diagram illustrating an embodiment of a process for requesting and receiving decentralized web content via remote gateways.

FIG. 14 is a flow diagram illustrating an embodiment of a process for requesting and receiving decentralized web content via remote gateways. An example of web browser 1402 is web browser 1104 of FIG. 11. An example of DNS gateway 1404 is DNS gateway 1108 of FIG. 11. An example of decentralized web gateway 1406 is decentralized web gateway 1110 of FIG. 11. An example of blockchain 1408 is blockchain 1106 of FIG. 11. An example of decentralized content network 1410 is decentralized content network 1112 of FIG. 11.

At 1412, browser 1402 requests DNS resolution of a domain of a provided name identifier to DNS gateway 1404.

For example, when a user requests content referenced by a provided name identifier "brave.crypto," the name of the domain included in the provided name identifier is to be resolved. Web browser 1402 has not been configured to directly handle blockchain-based domains and simply relies on its traditional DNS resolution flow by requesting its resolution to DNS gateway 1404.

DNS gateway 1404 is configured to detect that the ".crypto" portion of the domain of the provided name identifier is to be resolved using a blockchain of a blockchain-based name service. At 1414, a token version of the name of the domain of the provided name identifier is calculated. For example, rather than using the text version of the name of the domain, a hash identifier is calculated by hashing the text of the name of the domain. The hash identifier serves as the identifier of the non-fungible token representing the domain and is a more storage efficient representation of the name of the domain and the name of the domain can be easily converted to a hash identifier using a hash function.

At 1416, target records for the domain (identified by the calculated hash) are requested from blockchain 1408 (e.g., blockchain of a blockchain-based name service able to resolve the top-level domain of the name identifier). For example, a request is sent to a smart contract of the blockchain requesting a list of records associated with resolving and accessing content associated with the domain of the name identifier (e.g., domain records).

At 1418, the requested records are received. The received records may include configuration record(s) (e.g., including preferred decentralized web protocol) and may also include target location/content records of the domain for any supported protocol. The received records indicate that a decentralized web content is referenced by the domain.

In some embodiments, it is determined whether the browser that requested the resolution of the domain is able to directly handle/access decentralized web content. If it is determined that browser 1402 is unable to directly handle/access decentralized web content, at 1420, a decentralized web gateway IP address and decentralized web configurations are obtained from the received records to allow the web browser to access decentralized web content via decentralized web gateway 1406. If it is determined that the browser is able to directly handle/access decentralized web content, a decentralized web content hash identifier included in the received records may be returned directly to the browser to allow it to directly contact an appropriate decentralized content network to obtain the decentralized web content.

At 1422, a DNS response including an "A" response record with an IP address of the decentralized web gateway is provided in response to the request of 1412. In some embodiments, the provided response also indicates a decentralized content hash identifier extracted from the received records.

At 1424, web browser 1402 contacts decentralized web gateway 1406 using the received IP address to request content referenced by the name identifier.

At 1426, a token version of the domain of the provided name identifier is calculated. At 1428, target records for the domain (identified by the calculated hash) are requested from blockchain 1408 (e.g., blockchain of a blockchain-based name service able to resolve the top-level domain of the domain of the name identifier). For example, a request is sent to a smart contract of the blockchain requesting a list of records associated with resolving and accessing content associated with the domain of the name identifier (e.g., resolution records for the domain). At 1430, the requested records are received. The received records include a decentralized web content hash identifier. In an alternative embodiment, rather than performing 1426-1430, the decentralized web target content identifier received in 1422 and provided in association with the request of 1424 is utilized.

At 1432, decentralized web content identified by the extracted decentralized web target content identifier is requested to decentralized content network 1410. At 1434, the requested decentralized web content is received at decentralized web gateway 1406 from decentralized content network 1410. This decentralized web content is stored at gateway 1406 and at 1436 provided to browser 1402 via a traditional Hypertext Transfer Protocol (HTTP) as a response to the request of 1424.

Figure 15:
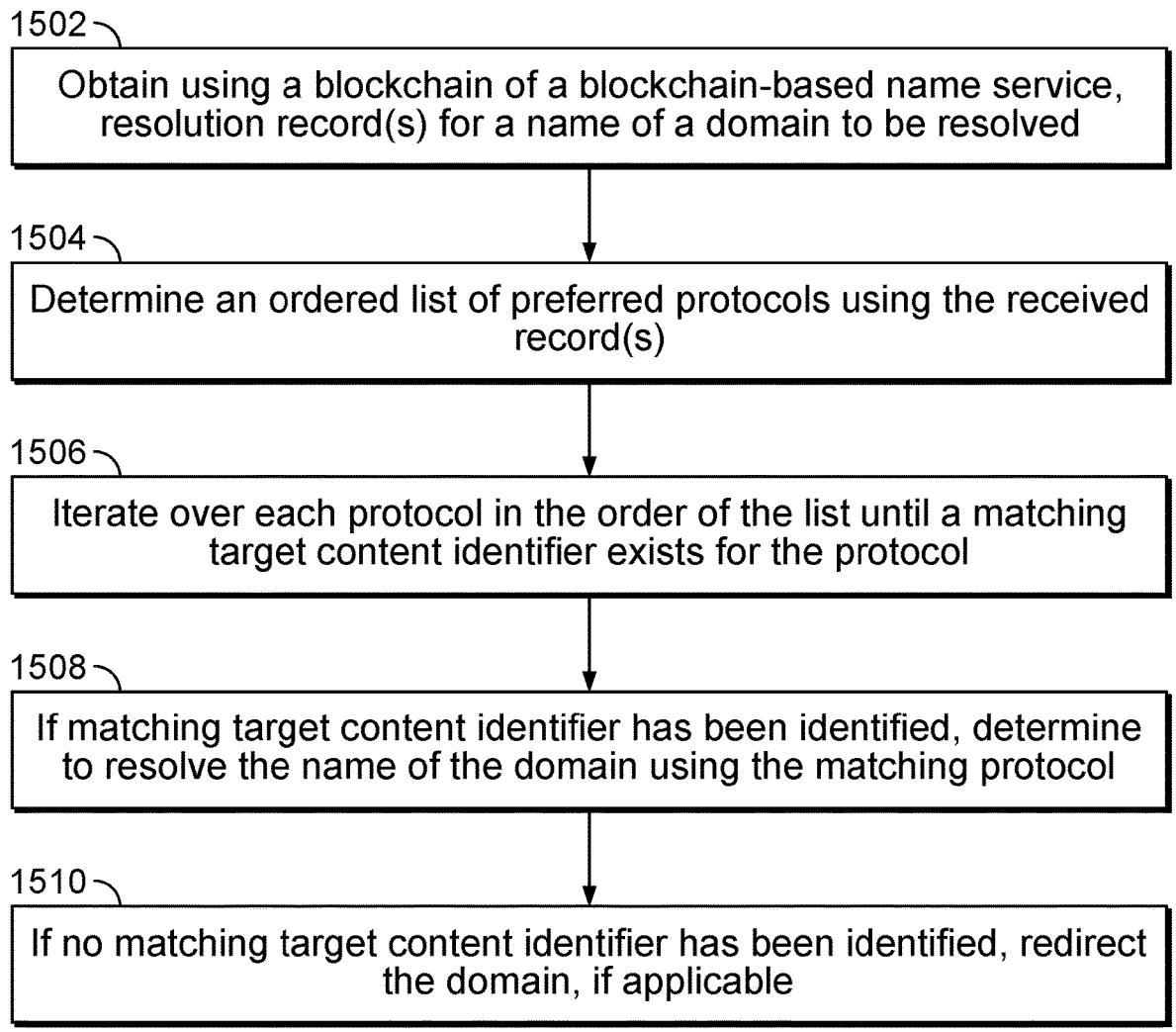
FIG. 15 is a flowchart illustrating an embodiment for handling protocol priority when performing domain resolution for a domain resolved using a blockchain of a blockchain-based name service.

FIG. 15 is a flowchart illustrating an embodiment for handling protocol priority when performing domain resolution for a domain resolved using a blockchain of a blockchain-based name service. In some embodiments, at least a portion of the process of FIG. 15 is performed by browser 1104 and/or DNS gateway 1108 of FIG. 11. A name of the domain can be resolved into any one of different targets for different protocols that are supported. For example, the domain can be resolved into an IP address if HTTP protocol is to be utilized or the domain can be resolved into a decentralized web content hash identifier if the decentralized web protocol (e.g., IPFS) is to be utilized. In some embodiments, the process of FIG. 15 can be utilized to select among different domain resolution options.

At 1502, resolution record(s) for a name of a domain to be resolved are obtained using a blockchain of a blockchain-based name service. In some embodiments, the resolution records include records received in 1208 of FIG. 12, 1318 of FIG. 13, 1418 of FIG. 14, and/or 1430 of FIG. 14. For example, the resolution records include records managed on the blockchain for the specified domain for use when resolving to a target identifier. The received resolution record(s) may include configurations, preferences, and/or one or more target records for one or more different protocols.

At 1504, an ordered list of preferred protocols is determined using the received records. If the domain has been specified in the blockchain records to support multiple protocols, one of the protocols is to be selected for use. The resolved target identifier for the domain will be the target identifier specified for that protocol among the different target identifiers specified for the different supported protocols. One of the received configuration records may specify an ordering of protocol preference such that the selected protocol is the one with the highest preference (e.g., appears in the list before another valid option) among protocols in the list that have been configured to be supported for the domain. In some embodiments, if the received records do not specify a preferred ordering of protocol or specifies an incomplete list, a default or modified preference ordering is utilized. For example, if a preferred order is not specified, the preferred order is ["bzz," "ipfs," "https," "http," "ftp" ]. In some embodiments, one or more protocols associated with decentralized web protocols but not specified in a specified preference are added to the beginning (higher priority) of a partially provided list or at the end of other specified decentralized web protocols in the partially provided list. In some embodiments, "http" protocol is added to the end (lower priority) of the partially provided list.

At 1506, each of the protocols in the ordered list is iterated in the order of the list until a matching target identifier is found. For example, there exists a different target identifier record for each of any supported protocol of the domain, and it is determined whether there exists a target identifier record for the protocol in the list being iterated. If a target identifier record has been defined for the protocol according to a record in the received record(s) for the domain, it is determined that the matching target identifier has been found. If a target identifier record has not been defined for the protocol in the received record(s), the iteration proceeds to the next protocol in the order of the list.

At 1508, if a matching target content identifier has been identified, it is determined to resolve the name of the domain using the matching protocol. The matching target content identifier is then returned for use in resolving and obtaining reference content of the domain.

At 1510, if no matching target content identifier has been identified after iterating through the entire ordered list of protocols, the domain is redirected, if applicable. For example, one of the received records may specify a redirect address/identifier for the domain, and if the redirect address/identifier exists, the domain is redirected by returning the redirect address/identifier to allow a recipient to contact the redirect address/identifier instead.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a request to resolve a name of a domain of an identifier of web content;
   automatically determining, at a Domain Name System (DNS) gateway, that the name of the domain is to be resolved using a blockchain;
   using an identifier associated with a non-fungible token to send a request to a smart contract associated with the blockchain to obtain one or more resolution records for the domain, wherein the blockchain stores the non-fungible token associating the domain to an account address of an owner of the domain;
   receiving the one or more resolution records of the domain; and
   utilizing the received one or more resolution records to resolve at least the name of the domain.

2. The method of claim 1, wherein the identifier of web content is associated with a Uniform Resource Locator (URL).

3. The method of claim 1, wherein the one or more resolution records of the domain are received at the Domain Name System (DNS) gateway.

4. The method of claim 1, wherein determining that the name of the domain is to be resolved using the blockchain includes determining that a top-level domain included in the name of the domain matches an entry in a list of domains to be resolved using the blockchain.

5. The method of claim 1, wherein the identifier of the non-fungible token is calculated using a hash function.

6. The method of claim 1, wherein the one or more resolution records include an Internet Protocol (IP) address.

7. The method of claim 1, wherein the one or more resolution records include a cryptocurrency address.

8. The method of claim 1, wherein the one or more resolution records includes a user identifier.

9. The method of claim 1, wherein the one or more resolution records include a redirect address.

10. The method of claim 1, wherein the one or more resolution records include a decentralized web content hash identifier.

11. The method of claim 1, wherein the one or more resolution records include a plurality of target identifiers for different protocols.

12. The method of claim 11, wherein utilizing the received one or more resolution records to resolve the name of the domain includes selecting one of the plurality of target identifiers based on an ordered list of protocol preferences.

13. The method of claim 12, wherein the ordered list of protocol preferences is at least in part specified in the one or more resolution records received using the blockchain.

14. The method of claim 1, wherein utilizing the received one or more resolution records to resolve the name of the domain includes providing a response including at least a portion of the one or more resolution records to a web browser.

15. The method of claim 1, wherein utilizing the received one or more resolution records to resolve the name of the domain includes providing an identifier of a decentralized web gateway.

16. The method of claim 15, wherein in response to a request made to the decentralized web gateway using the provided identifier of the decentralized web gateway, the decentralized web gateway obtains from a decentralized content network, decentralized web content referenced by a decentralized web content hash value included in the one or more resolution records of the domain, and stores and provides the obtained decentralized web content.

17. The method of claim 16, wherein the decentralized web gateway obtains the decentralized web content referenced by the decentralized web content hash value using a decentralized web protocol but provides the obtained decentralized web content using a protocol that is not the decentralized web protocol.

18. A system, comprising:
   a processor configured to:
      receive a request to resolve a name of a domain of an identifier of web content;
      automatically determine, at a Domain Name System (DNS) gateway, that the name of the domain is to be resolved using a blockchain;
      use an identifier associated with a non-fungible token to send a request to a smart contract associated with the blockchain to obtain one or more resolution records for the domain, wherein the blockchain stores the non-fungible token associating the domain to an account address of an owner of the domain;
      receive the one or more resolution records of the domain; and
      utilize the received one or more resolution records to resolve at least the name of the domain; and
   a memory coupled to the processor and configured to provide the processor with instructions.

19. The system of claim 18, wherein the one or more resolution records include one or more of the following: a cryptocurrency address, a user identifier, or a decentralized web content hash identifier.

20. A computer program product embodied in a non-transitory computer readable medium and comprising computer instructions for:
   receiving a request to resolve a name of a domain of an identifier of web content;
   automatically determining, at a Domain Name System (DNS) gateway, that the name of the domain is to be resolved using a blockchain;

using an identifier associated with a non-fungible token to send a request to a smart contract associated with the blockchain to obtain one or more resolution records for the domain, wherein the blockchain stores the non-fungible token associating the domain to an account address of an owner of the domain;

receiving the one or more resolution records of the domain; and utilizing the received one or more resolution records to resolve at least the name of the domain.

* * * * *